United States Patent
Kim et al.

(10) Patent No.: US 11,567,690 B2
(45) Date of Patent: Jan. 31, 2023

(54) SEMICONDUCTOR MEMORY DEVICE AND ELECTRONIC SYSTEM THE SAME

(71) Applicant: SAMSUNG ELECTRONICS CO., LTD., Suwon-si (KR)

(72) Inventors: Kyoungyoung Kim, Suwon-si (KR); Sangsoo Ko, Yongin-si (KR); Byeoungsu Kim, Hwaseong-si (KR); Jaegon Kim, Hwaseong-si (KR); Sanghyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 16/790,189

(22) Filed: Feb. 13, 2020

(65) Prior Publication Data
US 2021/0019076 A1    Jan. 21, 2021

(30) Foreign Application Priority Data
Jul. 15, 2019  (KR) .......................... 10-2019-0085380

(51) Int. Cl.
*G06F 3/06* (2006.01)
*G06N 3/02* (2006.01)
*G06N 3/08* (2006.01)

(52) U.S. Cl.
CPC .......... *G06F 3/0653* (2013.01); *G06F 3/0604* (2013.01); *G06F 3/0673* (2013.01); *G06N 3/02* (2013.01); *G06N 3/08* (2013.01)

(58) Field of Classification Search
CPC .... G06F 3/0653; G06F 3/0604; G06F 3/0673; G06F 3/0605; G06F 3/0658; G06F 3/0679; G06F 3/0659; G06F 3/0683; G06F 12/0223; G06F 12/0802; G06N 3/02; G06N 3/08; G06N 3/063
See application file for complete search history.

(56) References Cited

U.S. PATENT DOCUMENTS

| | | | |
|---|---|---|---|
| 6,240,489 B1 * | 5/2001 | Durham | G06F 12/125 711/E12.074 |
| 7,054,190 B2 | 5/2006 | Hanyu et al. | |
| 7,298,898 B2 | 11/2007 | Haque et al. | |
| 7,720,636 B1 * | 5/2010 | Baxter | G06F 13/1694 702/182 |
| 2016/0350617 A1 | 12/2016 | Willcock | |

(Continued)

OTHER PUBLICATIONS

NoC Technology Benefits, http://www.arteris.com/noc-technology-benefits, Jan. 20, 2018 via Internet Archive Wayback Machine (Year: 2018).*

*Primary Examiner* — Arpan P. Savla
*Assistant Examiner* — Edmund H Kwong
(74) *Attorney, Agent, or Firm* — Sughrue Mion, PLLC

(57) ABSTRACT

A semiconductor memory device is provided. The semiconductor memory device includes a memory core including a plurality of memory cells configured to store a plurality of data received from an external processor; and a statistical feature extractor disposed on a data path between the external processor and the memory core, the statistical feature extractor being configured to analyze statistical characteristics of the plurality of data, identify at least one statistical feature value associated with the statistical characteristics, store the at least one statistical feature value and transmit the at least one statistical feature value to the external processor.

18 Claims, 26 Drawing Sheets

(56) References Cited

U.S. PATENT DOCUMENTS

| | | |
|---|---|---|
| 2017/0278559 A1* | 9/2017 | Hush .................... G11C 7/1012 |
| 2017/0357452 A1 | 12/2017 | Gregory |
| 2018/0276539 A1 | 9/2018 | Lea |
| 2019/0056885 A1 | 2/2019 | Mathuriya et al. |

* cited by examiner

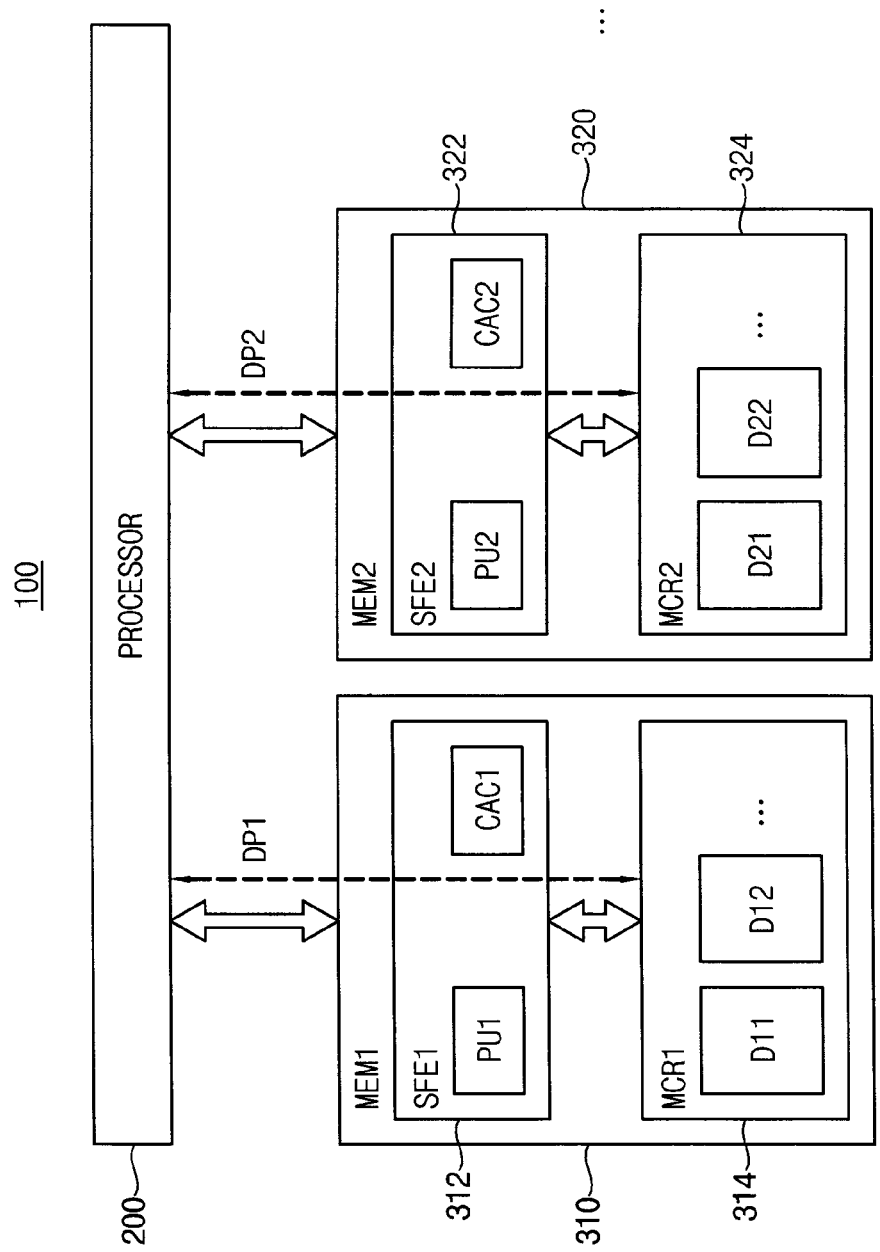

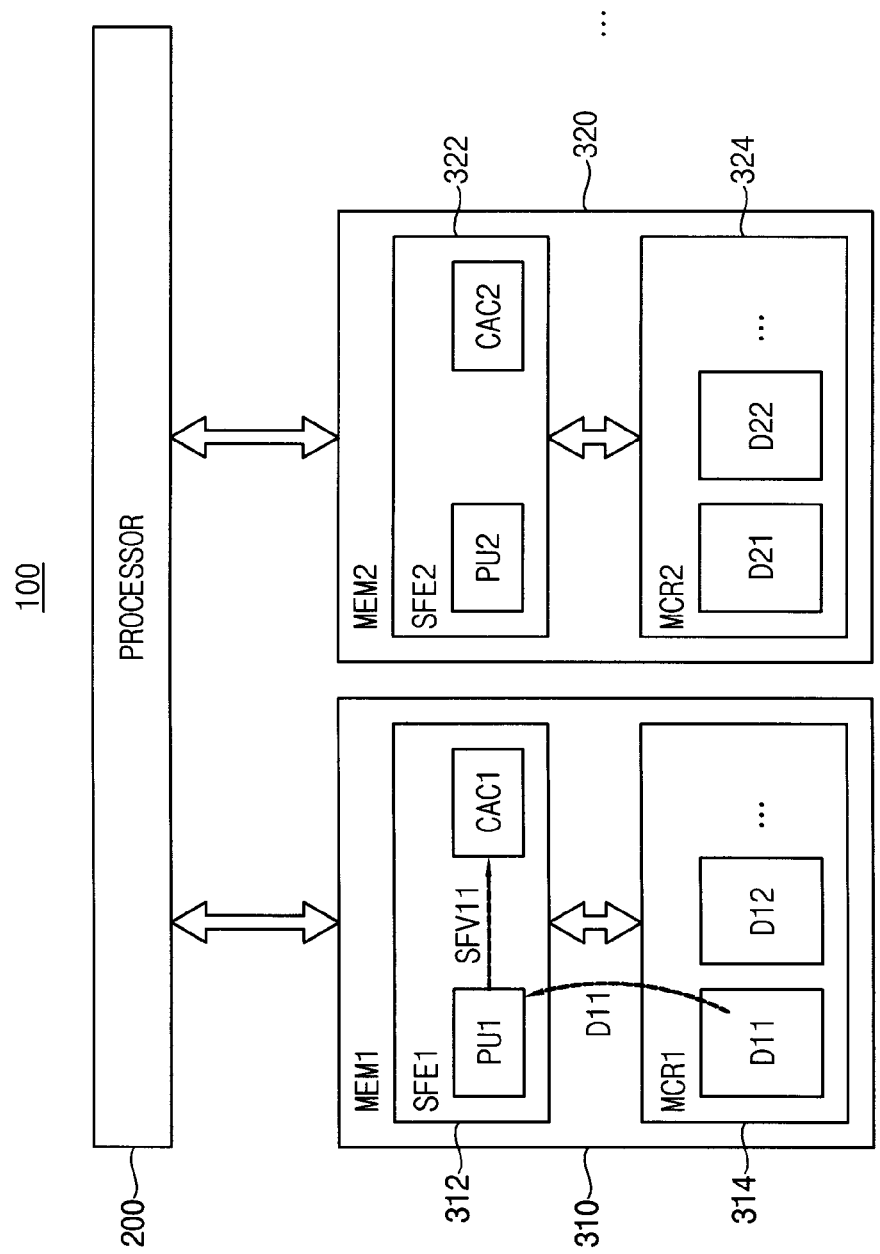

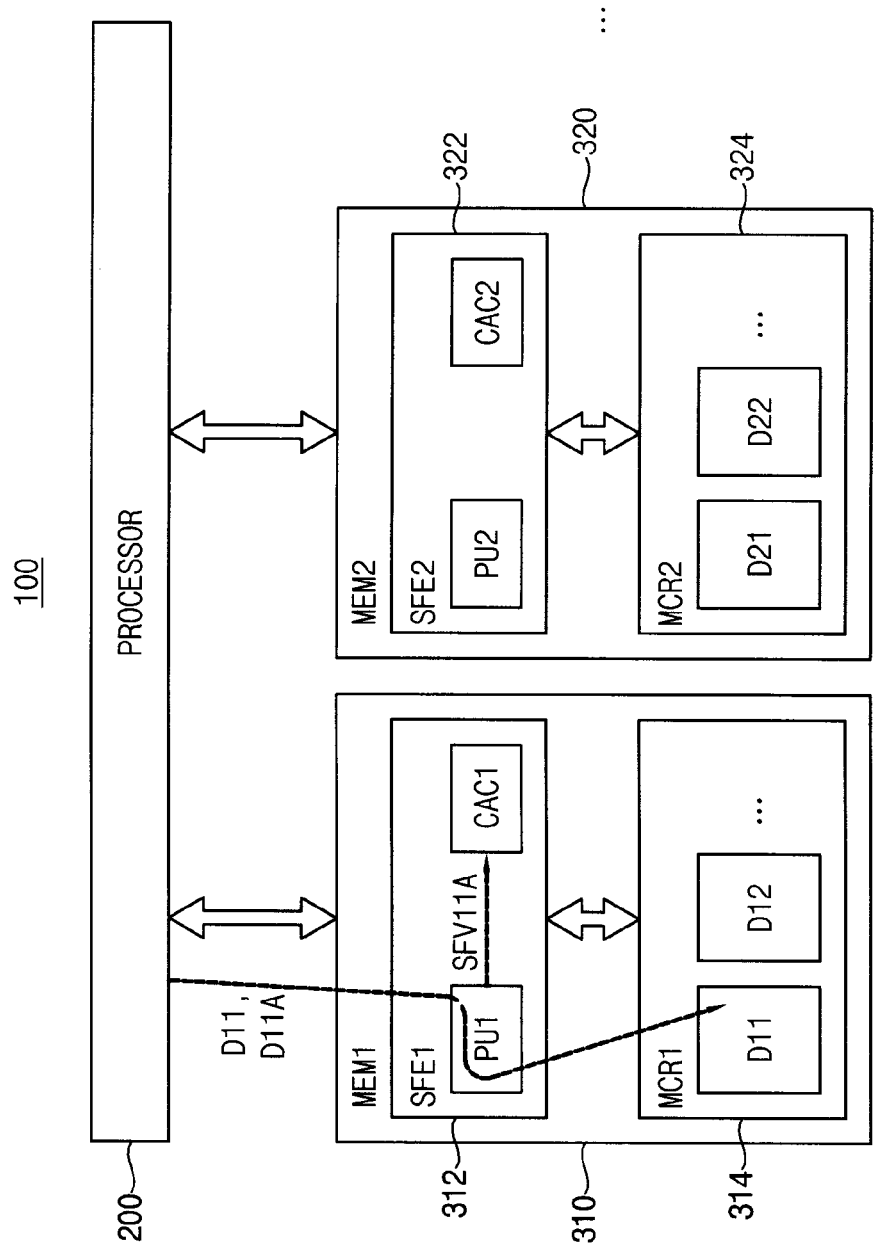

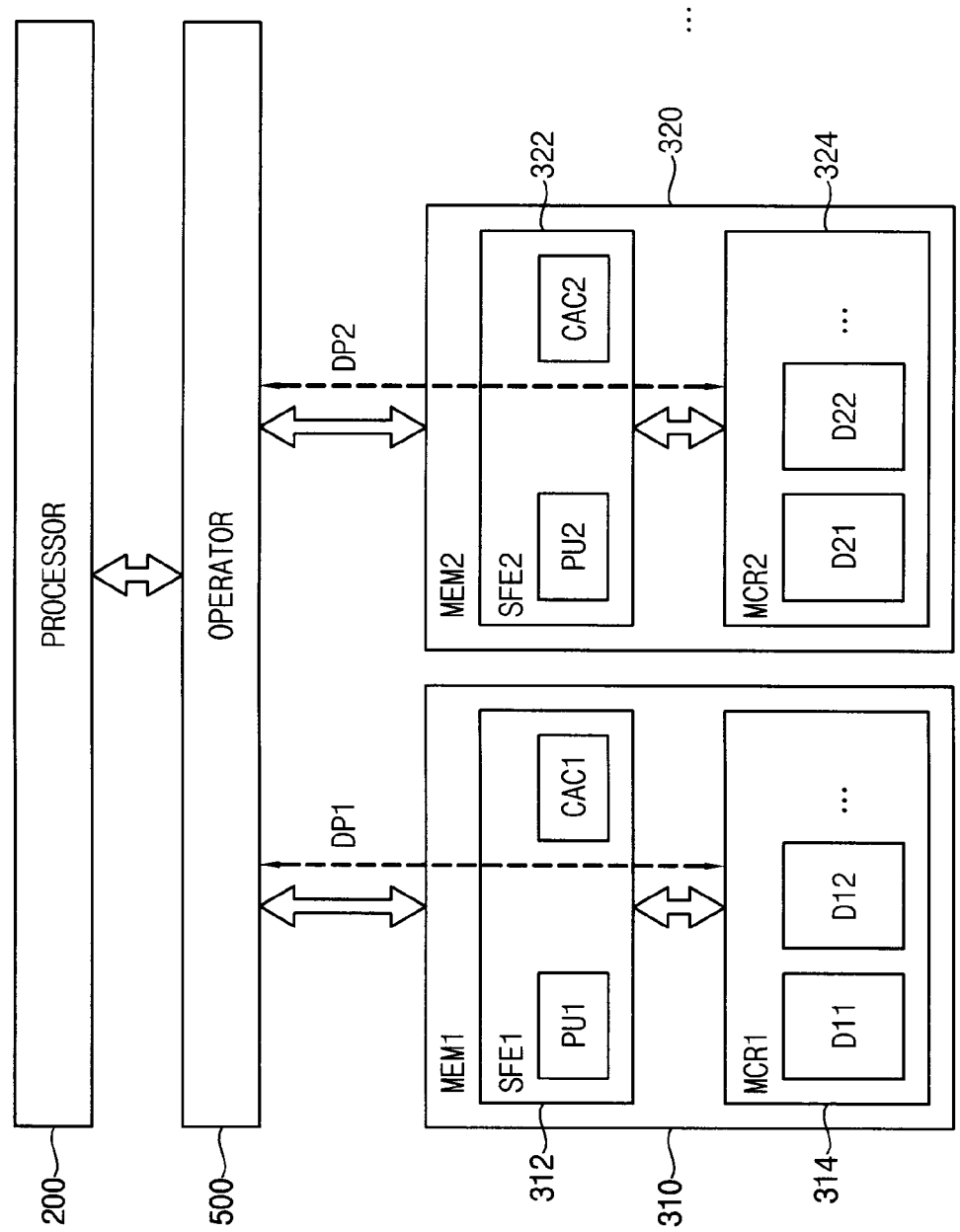

SEMICONDUCTOR MEMORY DEVICE AND ELECTRONIC SYSTEM THE SAME

CROSS-REFERENCE TO RELATED APPLICATION

This application claims priority from Korean Patent Application No. 10-2019-0085380, filed on Jul. 15, 2019 in the Korean Intellectual Property Office, the disclosure of which is incorporated herein by reference in its entirety.

BACKGROUND

1. Field

Example embodiments relate generally to semiconductor integrated circuits, and more particularly to semiconductor memory devices and electronic systems including the semiconductor memory devices.

2. Related Art

In a computing system architecture, instructions (or programs) and data are stored in a memory device spaced apart from a processor, and the instructions and the data are transferred from the memory device to the processor to perform data processing on the data based on the instructions. Thus, although a processing speed of the processor has increased, a data transfer rate between the memory device and the processor may serve as a bottleneck for the performance improvement, and a throughput of the computing system may be limited. To address this issue, a processing-in-memory (PIM) device where processor logic is tightly coupled to memory cells has been developed.

In addition, recent technologies such as artificial intelligence image recognition (e.g., video/motion recognition), deep learning, and machine learning have been developed, and intelligent service that automatically recognizes data such as voice, image, video, or text and provides information related to data or provide services related to data is used in various fields.

SUMMARY

At least one example embodiment of the present disclosure provides a semiconductor memory device capable of efficiently analyzing the statistical characteristics of stored data and improving data processing efficiency.

At least one example embodiment of the present disclosure provides an electronic system including the semiconductor memory device and capable of improving data processing efficiency.

According to example embodiments, a semiconductor memory device includes a memory core including a plurality of memory cells configured to store a plurality of data received from an external processor; and a statistical feature extractor disposed on a data path between the external processor and the memory core, the statistical feature extractor being configured to analyze statistical characteristics of the plurality of data, identify at least one statistical feature value associated with the statistical characteristics, store the at least one statistical feature value and transmit the at least one statistical feature value to the external processor.

According to example embodiments, an electronic system includes a processor; and a plurality of semiconductor memory devices configured to store a plurality of data provided from the processor. A first semiconductor memory device among the plurality of semiconductor memory devices includes: a first memory core including a plurality of first memory cells that store first data among the plurality of data; and a first statistical feature extractor disposed on a first data path between the processor and the first memory core, the first statistical feature extractor being configured to analyze first statistical characteristics of the first data, identify at least one first statistical feature value associated with the first statistical characteristics, store the at least one first statistical feature value and transmit the at least one first statistical feature value to the processor.

According to example embodiments, an electronic system includes at least one processor; and a plurality of semiconductor memory devices. Each of the plurality of semiconductor memory devices includes: a memory core including a plurality of memory cells configured to store a plurality of data provided from the at least one processor; and a statistical feature extractor disposed on a data path between the at least one processor and the memory core, the statistical feature extractor being configured to analyze statistical characteristics of the plurality of data input, identify at least one statistical feature value associated with the statistical characteristics, store the at least one statistical feature value and transmit the at least one statistical feature value to the at least one processor. The statistical feature extractor includes: a processor configured to access the plurality of data via the data path when the external processor is storing the plurality of data in the memory core, access the plurality of data from the memory core during an idle time of the memory core after the plurality of data is stored in the memory core, and identify the at least one statistical feature value; and an internal cache configured to store the at least one statistical feature value, and transmit the stored at least one statistical feature value to the at least one processor instead of transmitting the plurality of data to the at least one processor based on the at least one processor requesting the statistical characteristics of the plurality of data.

BRIEF DESCRIPTION OF THE DRAWINGS

The above and other objects and features will be more clearly understood from the following detailed description taken in conjunction with the accompanying drawings.

FIG. 1 is a block diagram illustrating an electronic system including a semiconductor memory device according to example embodiments.

FIGS. 4A and 4B are diagrams for illustrating operation of an electronic system according to example embodiments.

FIGS. 6, 7, 8, 9A, 9B and 9C are diagrams for illustrating operation of electronic systems according to example embodiments.

FIGS. 10, 11 and 12 are block diagrams illustrating electronic systems including a semiconductor memory device according to example embodiments.

DETAILED DESCRIPTION

Figure 2A:
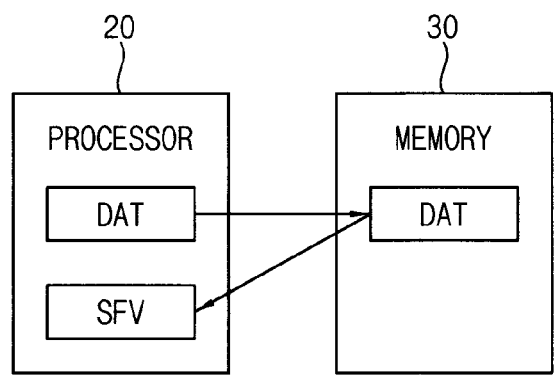
FIGS. 2A, 2B, 2C, 2D, 2E and 2F are diagrams illustrating operation of electronic systems according to example embodiments.

Various example embodiments will be described more fully with reference to the accompanying drawings. The present disclosure may, however, be embodied in many different forms and should not be construed as limited to the embodiments set forth herein. Like reference numerals refer to like elements throughout this application. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a block diagram illustrating an electronic system including a semiconductor memory device according to example embodiments.

Referring to FIG. 1, an electronic system 100 includes at least one processor 200 and a plurality of semiconductor memory devices 310, 320, . . . .

The processor 200 controls overall operations of the electronic system 100, and performs operations on a plurality of data D11, D12, . . . , D21, D22, . . . . For example, the processor 200 may be driven by executing an operating system (OS).

In some example embodiments, the processor 200 may include at least one of a central processing unit (CPU), a graphic processing unit (GPU), a neural processing unit (NPU), a digital signal processor (DSP), an image signal processor (ISP) and a dedicated hardware (DHW). For example, the dedicated hardware may include a vision processing unit (VPU), a vision intellectual property (VIP), etc.

The plurality of semiconductor memory devices 310 and 320 may include a first semiconductor memory device 310 and a second semiconductor memory device 320. For convenience of illustration, only two semiconductor memory devices 310 and 320 are illustrated in FIG. 1, however, the number of semiconductor memory devices included in the electronic system 100 may be changed according to example embodiments.

The plurality of semiconductor memory devices 310 and 320 stores the plurality of data D11, D12, D21 and D22 that are provided from the processor 200. For example, each of the plurality of semiconductor memory devices 310 and 320 includes a memory core or a memory core region (MCR) that includes a plurality of memory cells and stores the plurality of data D11, D12, D21 and D22.

For example, the first semiconductor memory device 310 includes a first memory core (MCR1) 314 that stores first data D11, D12, . . . among the plurality of data D11, D12, D21 and D22. Similarly, the second semiconductor memory device 320 includes a second memory core (MCR2) 324 that stores second data D21, D22, . . . among the plurality of data D11, D12, D21 and D22.

In addition, the plurality of semiconductor memory devices 310 and 320 internally analyzes statistical characteristics of the plurality of data D11, D12, D21 and D22 to obtain and store statistical feature values. For example, each of the plurality of semiconductor memory devices 310 and 320 includes a statistical feature extractor (SFE). The statistical feature extractor may include a processing unit (PU) (i.e., processor) and an internal cache (CAC). The statistical feature extractor may be referred to as a PU layer or a PU logic.

For example, the first semiconductor memory device 310 includes a first statistical feature extractor (SFE1) 312. The first statistical feature extractor 312 is disposed on a first data path DP1 between the processor 200 and the first memory core 314, analyzes first statistical characteristics of the first data D11 and D12 input from the processor 200 or output from the first memory core 314 to obtain and store at least one first statistical feature value associated with the first statistical characteristics, and transmits the at least one first statistical feature value to the processor 200.

The first statistical feature extractor 312 may include a first processing unit PU1 and a first internal cache CAC1. The first processing unit PU1 may analyze the first statistical characteristics based on the first data D11 and D12, and may calculate and obtain the at least one first statistical feature value. For example, the first data D11 and D12 may be received through the first data path DP1 when the processor 200 stores the first data D11 and D12 in the first memory core 314, or may be read or retrieved from the first memory core 314 during an idle time of the first memory core 314 after the first data D11 and D12 are stored in the first memory core 314. The first internal cache CAC1 may store the at least one first statistical feature value, and may transmit the at least one first statistical feature value to the processor 200 by a request of the processor 200. In other words, when the processor 200 requests the first statistical characteristics of the first data D11 and D12, the at least one first statistical feature value stored in the first internal cache CAC1 may be transmitted to the processor 200 instead of transmitting the first data D11 and D12 to the processor 200.

Similarly, the second semiconductor memory device 320 includes a second statistical feature extractor (SFE2) 322. The second statistical feature extractor 322 is disposed on a second data path DP2 between the processor 200 and the second memory core 324, analyzes second statistical characteristics of the second data D21 and D22 input from the processor 200 or output from the second memory core 324 to obtain and store at least one second statistical feature value associated with the second statistical characteristics, and transmits the at least one second statistical feature value to the processor 200.

The second statistical feature extractor 322 may include a second processing unit PU2 and a second internal cache CAC2. The second processing unit PU2 may analyze the second statistical characteristics based on the second data D21 and D22, and may calculate and obtain the at least one second statistical feature value. For example, the second data D21 and D22 may be received through the second data path DP2 when the processor 200 is to store the second data D21 and D22 in the second memory core 324, or may be read or retrieved from the second memory core 324 during an idle time of the second memory core 324 after the second data D21 and D22 are stored in the second memory core 324. The second internal cache CAC2 may store the at least one second statistical feature value, and may transmit the at least one second statistical feature value to the processor 200 by a request of the processor 200.

In some example embodiments, each of the first and second processing units PU1 and PU2 may include a Processing-In-Memory (PIM) device or a Field Programmable Gate Array (FPGA) device, or any device that performs processing in the semiconductor memory device.

In some example embodiments, each of the first and second statistical feature values that are calculated and obtained by the first and second processing units PU1 and PU2 may include the number of data, a histogram of data, a maximum value of data, a minimum value of data, an average value of data, a median value of data, a variance of data, a standard deviation of data and a fractional length of data, or an intermediate result value for calculating the number of data, the histogram, the maximum value, the minimum value, the average value, the median value, the variance, the standard deviation and the fractional length. Alternatively, each of the first and second statistical feature values may further include various other statistical features.

In some example embodiments, the fractional length may represent a value of lengths of an integer portion and a fractional portion of the data. For example, when input data is stored in the semiconductor memory devices 310 and 320 or when data stored in the semiconductor memory devices 310 and 320 is output, the fractional length may include changing data format to Floating Point 32 (FP32), Integer 16 bit (INT16) or Integer 32 bit (INT32).

According to example embodiments, each processing unit may be implemented in various forms such that each processing unit is included in the same package with each semiconductor memory device or in different packages from each semiconductor memory device, and/or each processing unit is disposed in or independent of a memory buffer within each semiconductor memory device, etc.

According to example embodiments (for example, as described with reference to FIGS. 2C, 2D, 2E and 2F), each processing unit may perform arithmetic processing within the same clock as data received through the data path.

In some example embodiments, each of the plurality of semiconductor memory devices 310 and 320 may include at least one volatile memory such as a dynamic random access memory (DRAM), a synchronous DRAM (SDRAM), a static random access memory (SRAM), a thyristor random access memory (TRAM), etc., and/or at least one nonvolatile memory such as a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc. In some example embodiments, each of the plurality of semiconductor memory devices 310 and 320 may include at least one of various memory architectures such as a three-dimensional stack (3DS) module, a high bandwidth memory (HBM) module, a hybrid memory cube (HMC) module, etc. and/or at least one of various storage devices such as a solid state drive or solid state disk (SSD), an embedded SSD (eSSD), a multimedia card (MMC), an embedded MMC (eMMC), a universal flash storage (UFS), etc.

In some example embodiments, the electronic system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc. In other example embodiments, the electronic system 100 may be any computing system, such as a personal computer (PC), a server computer, a workstation, a digital television, a set-top box, a navigation system, etc.

In some example embodiments (for example, as described below with reference to FIG. 17), the electronic system 100 may be used to drive at least one of various neural network systems and/or machine learning systems, e.g., an artificial neural network (ANN) system, a convolutional neural network (CNN) system, a deep neural network (DNN) system, a deep learning system, or the like. For example, at least one of various services and/or applications, e.g., an image classify service, a user authentication service based on bio-information or biometric data, an advanced driver assistance system (ADAS) service, a voice assistant service, an automatic speech recognition (ASR) service, or the like, may be performed, executed or processed by the electronic system 100. In this example, the plurality of data D11, D12, D21 and D22 that are processed or treated by the processor 200 and stored in the plurality of semiconductor memory devices 310 and 320 may represent a plurality of weights or a plurality of input/output (I/O) feature maps included in a plurality of layers of a neural network system.

FIGS. 2A, 2B, 2C, 2D, 2E and 2F are diagrams illustrating operation of electronic systems according to example embodiments.

Referring to FIG. 2A, in an electronic system, a processor 20 performs operations on data DAT, and writes the data DAT in a semiconductor memory device 30. Subsequently, when it is necessary for the processor 20 to obtain a statistical feature value SFV for the data DAT, the processor 20 reads the data DAT written in the semiconductor memory device 30, and analyzes the read data DAT to obtain the statistical feature value SFV.

In the electronic system of FIG. 2A, the total amount of data transferred between the processor 20 and the semiconductor memory device 30 is twice a size of the data DAT, and the total data processing time of the processor 20 is a sum of a time required to write the data DAT, a time required to read the data DAT and a computation time required to obtain the statistical feature value SFV.

Figure 2B:
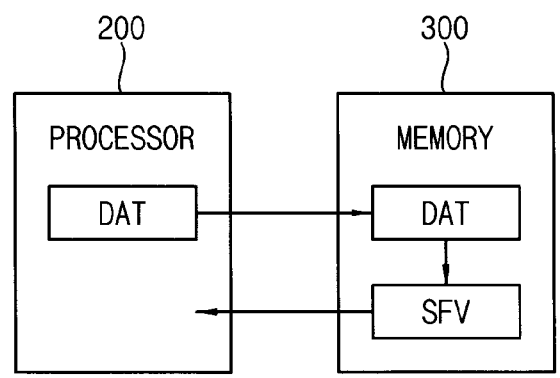

Referring to FIG. 2B, in an electronic system according to example embodiments, a processor 200 performs operations on data DAT, and writes the data DAT in a semiconductor memory device 300. The semiconductor memory device 300 internally, by itself, obtains and stores a statistical feature value SFV for the data DAT using a statistical feature extractor (e.g., the first statistical feature extractor 312 or the second statistical feature extractor 322 in FIG. 1) included therein. Subsequently, when it is necessary for the processor 200 to obtain the statistical feature value SFV for the data DAT, the processor 200 reads the statistical feature value SFV stored in the semiconductor memory device 300 (e.g., stored in the statistical feature extractor).

In the electronic system of FIG. 2B according to example embodiments, the total amount of data transferred between the processor 200 and the semiconductor memory device 300 is a sum of a size of the data DAT and a size of the statistical feature value SFV, and the total data processing time of the processor 200 is a sum of a time required to write the data DAT and a time required to read the statistical feature value SFV. Typically, a size of the statistical feature value SFV is much smaller than a size of the data DAT, and thus the time required to read the statistical feature value SFV is also much shorter than a time required to read the data DAT. Accordingly, the amount of transferred data and data processing time may be reduced.

In the semiconductor memory device and the electronic system according to example embodiments, the semiconductor memory device may include the statistical feature extractor for analyzing the statistical characteristics or properties of data received from the processor or stored therein. When the statistical characteristics are required, the semiconductor memory device may transmit the statistical characteristics to the processor, instead of the processor reading out the entire data and analyzing/calculating the statistical characteristics. Accordingly, the overhead of the data input and output between the processor and the semiconductor memory device and the data operation/processing of the processor may be reduced, the statistical characteristics of the data may be quickly and efficiently obtained, and the data processing efficiency may be improved or enhanced.

Particularly, when the semiconductor memory device and the electronic system according to example embodiments is used to drive at least one of various neural network systems and/or machine learning systems, an inference or training operation may be performed by quickly and efficiently obtaining and identifying statistical characteristics of each of the plurality of layers of the neural network system and/or statistical characteristics of specific regions of the plurality of layers. Thus, the example embodiments may be applied to various operations using the region-specific characteristics in the neural network system, e.g., an operation of calculating a weight density distribution to determine a pruning rate, an operation of calculating an interpolation based on a pruning rate, a sensitivity and/or a weight, an operation of quantizing based on a minimum value and a maximum value, an operation of changing a fractional length during writing and reading, an operation of stopping early during transfer learning, an operation of identifying out of vocabulary in the ASR to change another model, or the like.

Figure 2C:
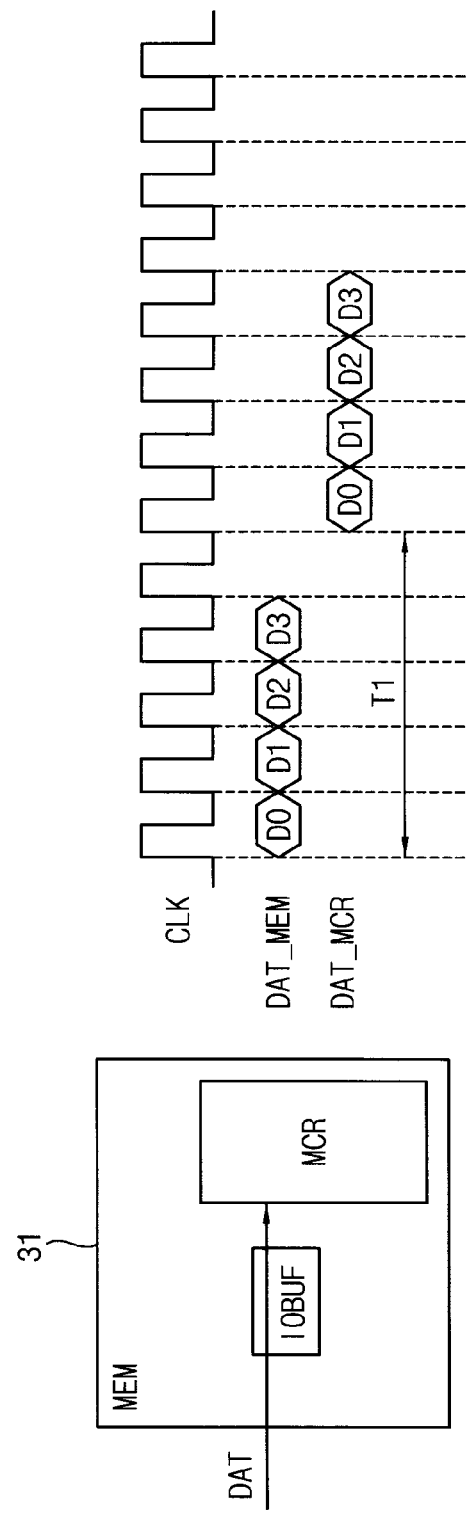

Referring to FIG. 2C, a semiconductor memory device 31 receives and stores the data DAT based on a clock signal CLK. As an example, the data DAT may include D0, D1, D2 and D3. A first total delay latency T1 may occur between a time when data DAT_MEM is input to the semiconductor memory device 31 and a time when data DAT_MCR is input to a memory core MCR due to a data input/output (I/O) buffer IOBUF. For convenience of illustration, although only the data I/O buffer IOBUF is illustrated in FIG. 2C and subsequent figures, the first total delay latency T1 may represent a sum of latencies caused by a data I/O buffer 495, an I/O gating circuit 490, a sense amplifier 485, etc. corresponding to elements between data and a memory core in FIG. 3.

Figure 2D:
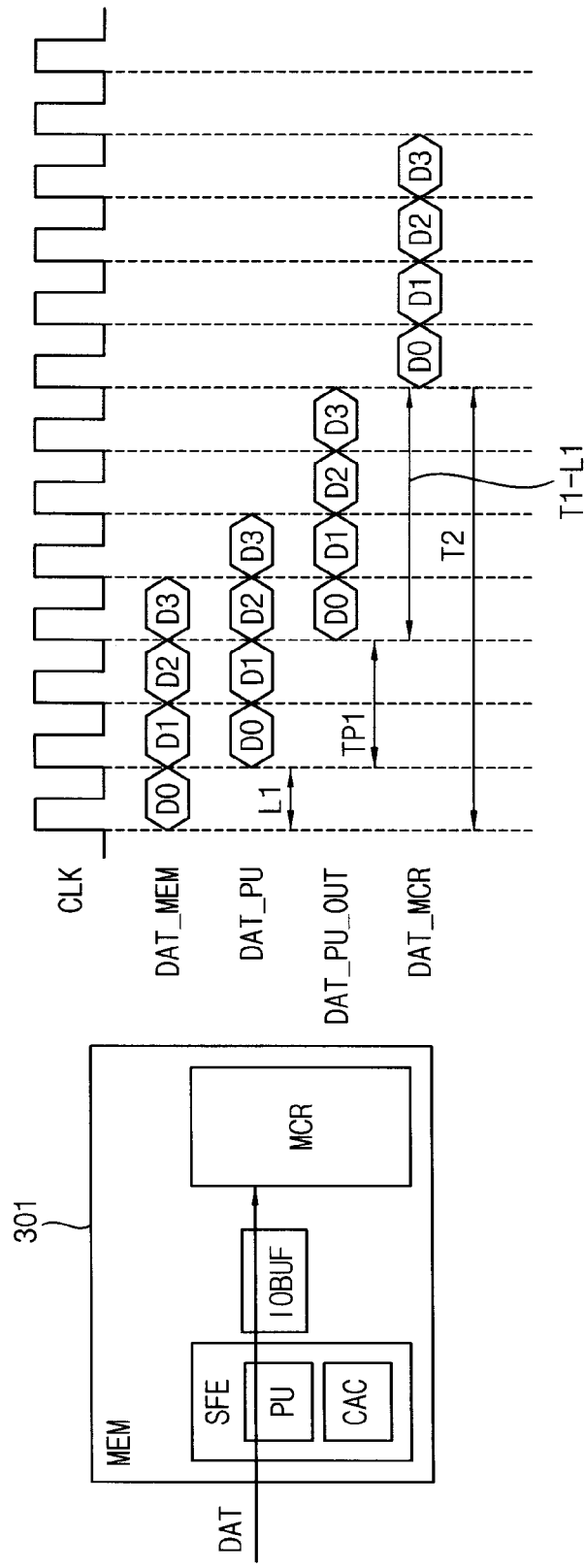
Figure 2E:
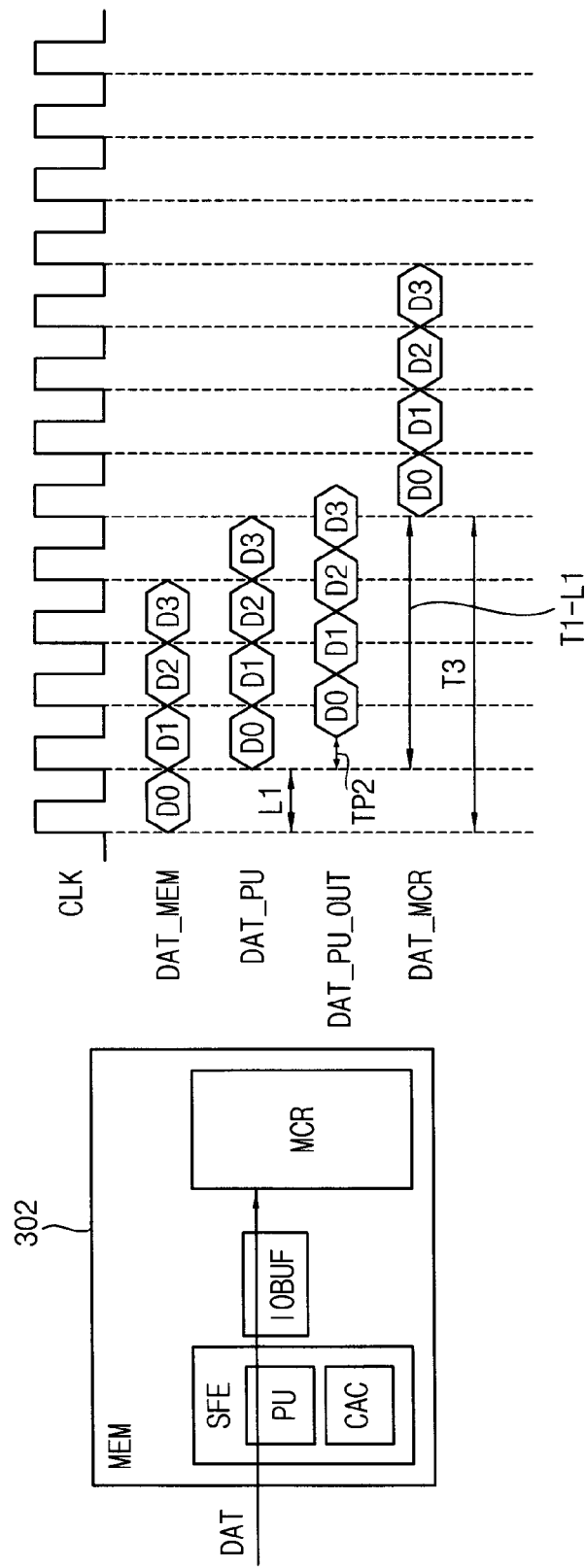
Figure 2F:
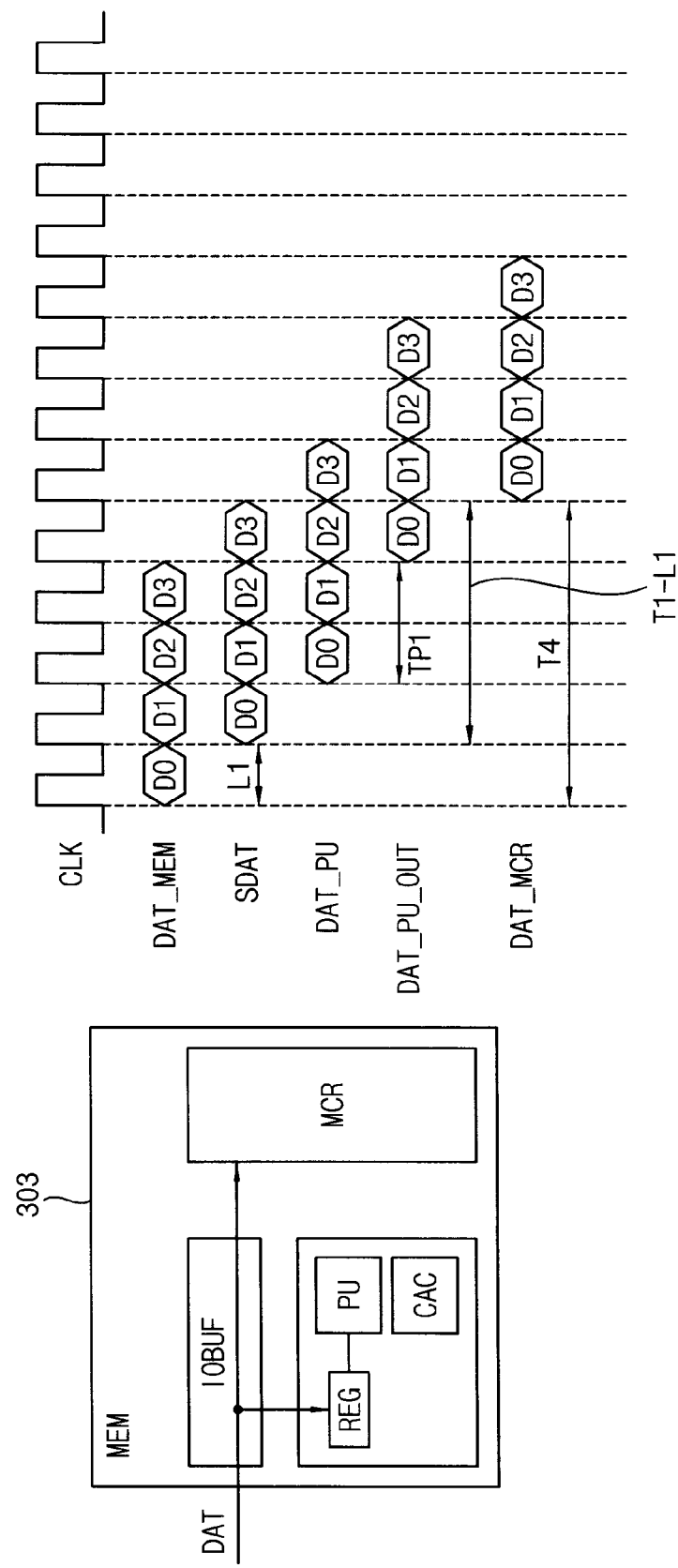

Referring to FIGS. 2D, 2E and 2F, semiconductor memory devices 301, 302 and 303 according to example embodiments also receive and store the data DAT based on a clock signal CLK. A processing element PU included in the semiconductor memory devices 301, 302 and 303 may perform arithmetic processing within the same clock as data received through a data path.

As illustrated in FIG. 2D, a latency L1 may occur between data DAT_MEM being input to the semiconductor memory device 301 and data DAT_PU being input to the processing element PU. The latency L1 may be shorter than or equal to one period of a clock signal CLK. Data DAT_PU input to the processing element PU may be delayed by the latency L1. A first delay latency TP1 may also occur at data DAT_PU_OUT being output from the processing element PU. The first delay latency TP1 may be generated by the processing element PU and may be longer than one period of the clock signal CLK. In addition, a latency (T1-L1) may occur from a time when data is input to the processing element PU to a time when data is input to the memory core MCR. Thus, a second total delay latency T2, which is longer than the first total delay latency T1, may occur between a time when the data DAT_MEM is input to the semiconductor memory device 301 and a time when data DAT_MCR is input to the memory core.

As illustrated in FIG. 2E, the latency L1 may occur between data DAT_MEM being input to the semiconductor memory device 302 and data DAT_PU being input to the processing element PU. Data DAT_PU input to the processing element PU may be delayed by the latency L1. A second delay latency TP2 may also occur at data DAT_PU_OUT being output from the processing element PU. The second delay latency TP2 may be generated by the processing element PU and may be shorter than one period of the clock signal CLK. In this example, the second delay latency TP2 may be hidden (e.g., included) in the latency (T1-L1) from the processing element PU to the memory core MCR. Thus, a third total delay latency T3, which is substantially equal to the first total delay latency T1, may occur between the data DAT_MEM input to the semiconductor memory device 302 and data DAT_MCR input to the memory core. In other words, the processing element PU in FIG. 2E may operate within one period of the clock signal CLK so that a delay does not occur in transmission of data, and thus the data may be received and stored without additional delay.

As illustrated in FIG. 2F, the first delay latency TP1 generated by the processing element PU in the semiconductor memory device 303 may be longer than one period of the clock signal CLK. However, data DAT between an input and the memory core MCR may be snooped using a register REG, and the processing element PU may receive the snooped data SDAT to perform a calculation operation. Thus, a fourth total delay latency T4, which is substantially equal to the first total delay latency T1, may occur between a time when the data DAT_MEM is input to the semiconductor memory device 303 and a time when data DAT_MCR is input to the memory core, regardless or independent of the latency TP1 by the processing element PU. In other words, the semiconductor memory device 303 (e.g., the statistical feature extractor) in FIG. 2F may further include the register REG for the snooping operation, the processing element PU may calculate statistical characteristics by snooping the data so as not to interfere with the transmission of the data, the statistical characteristics may be calculated without additional latency by snooping the data while the data is transmitted to extract the statistical characteristics, and thus the data may be received and stored without additional delay.

Figure 3:
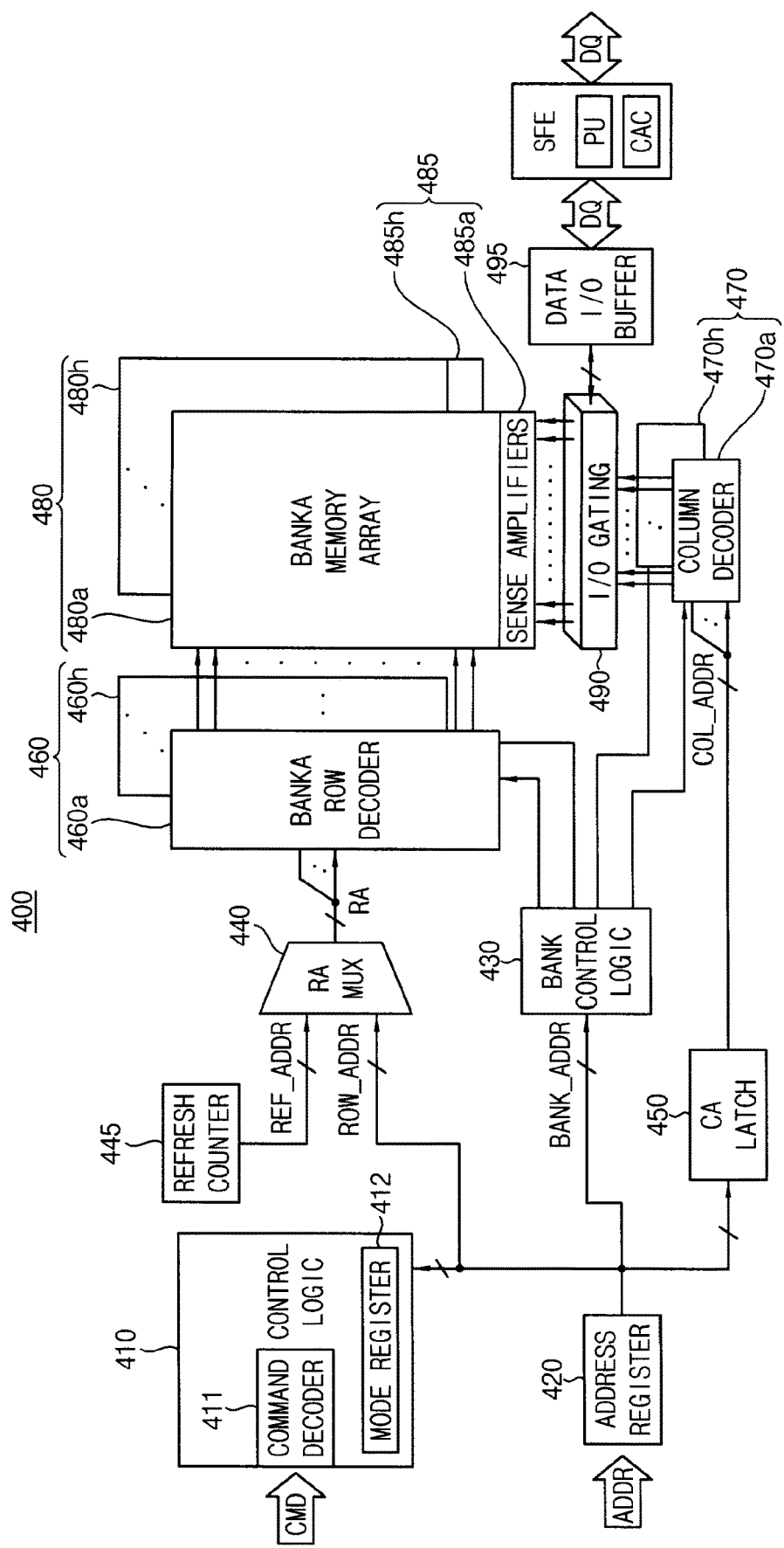
FIG. 3 is a block diagram illustrating an example of a semiconductor memory device according to example embodiments.

FIG. 3 is a block diagram illustrating an example of a semiconductor memory device according to example embodiments.

A DRAM is described as an example of the semiconductor memory device, however, embodiments are not limited thereto and the semiconductor memory device may be any of a variety of memory cell architectures, including, but not limited to, volatile memory architectures such as DRAM, SRAM, TRAM, and the like, or nonvolatile memory architectures such as flash memory, PRAM, RRAM, MRAM, FRAM, and the like.

Referring to FIG. 3, a semiconductor memory device or memory integrated circuit 400 includes a control logic 410, an address register 420, a bank control logic 430, a row address multiplexer 440, a refresh counter 445, a column address latch 450, a row decoder 460, a column decoder 470, a memory cell array 480, a sense amplifier 485, an input/output (I/O) gating circuit 490, a data input/output (I/O) buffer 495 and a statistical feature extractor SFE.

The memory cell array 480 may include a plurality of bank arrays 480a~480h. The row decoder 460 may include a plurality of bank row decoders 460a~460h respectively coupled to the bank arrays 480a~480h, the column decoder 470 may include a plurality of bank column decoders 470a~470h respectively coupled to the bank arrays 480a~480h, and the sense amplifier 485 may include a plurality of bank sense amplifiers 485a~485h respectively coupled to the bank arrays 480a~480h.

The address register 420 may receive an address ADDR including a bank address BANK_ADDR, a row address ROW_ADDR and a column address COL_ADDR from an external processor or an external memory controller. The address register 420 may provide the received bank address BANK_ADDR to the bank control logic 430, may provide the received row address ROW_ADDR to the row address multiplexer 440, and may provide the received column address COL_ADDR to the column address latch 450.

The bank control logic 430 may generate bank control signals based on the bank address BANK_ADDR. One of the bank row decoders 460a~460h corresponding to the bank address BANK_ADDR may be activated based on the bank control signals, and one of the bank column decoders 470a~470h corresponding to the bank address BANK_ADDR may be activated based on the bank control signals.

The row address multiplexer 440 may receive the row address ROW_ADDR from the address register 420, and may receive a refresh row address REF_ADDR from the refresh counter 445. The row address multiplexer 440 may selectively output the row address ROW_ADDR or the refresh row address REF_ADDR as a row address RA. The row address RA that is output from the row address multiplexer 440 may be applied to the bank row decoders 460a~460h.

The activated one of the bank row decoders 460a~460h may decode the row address RA that is output from the row address multiplexer 440, and may activate a wordline corresponding to the row address RA. For example, the activated bank row decoder may apply a wordline driving voltage to the wordline corresponding to the row address RA.

The column address latch 450 may receive the column address COL_ADDR from the address register 420, and may temporarily store the received column address COL_ADDR. In some example embodiments, in a burst mode, the column address latch 450 may generate column addresses that increment from the received column address COL_ADDR. The column address latch 450 may apply the temporarily stored or generated column address to the bank column decoders 470a~470h.

The activated one of the bank column decoders 470a~470h may decode the column address COL_ADDR that is output from the column address latch 450, and may control the I/O gating circuit 490 to output data corresponding to the column address COL_ADDR.

The I/O gating circuit 490 may include circuitry for gating input/output data. The I/O gating circuit 490 may further include read data latches for storing data that is output from the bank arrays 480a~480h, and write drivers for writing data to the bank arrays 480a~480h.

Data to be read from one bank array of the bank arrays 480a~480h may be sensed by a sense amplifier 485 coupled to the one bank array from which the data is to be read, and may be stored in the read data latches. The data stored in the read data latches may be provided to the processor or the memory controller via the data I/O buffer 495. Data DQ to be written in one bank array of the bank arrays 480a~480h may be provided to the data I/O buffer 495 from the processor or the memory controller. The write driver may write the data DQ in one bank array of the bank arrays 480a~480h.

The control logic 410 may control operations of the memory integrated circuit 400. For example, the control logic 410 may generate control signals for the memory integrated circuit 400 to perform a write operation or a read operation. The control logic 410 may include a command decoder 411 that decodes a command CMD received from the memory controller and a mode register set 412 that sets an operation mode of the memory integrated circuit 400. For example, the command decoder 411 may generate the control signals corresponding to the command CMD by decoding a write enable signal, a row address strobe signal, a column address strobe signal, a chip selection signal, etc.

The statistical feature extractor SFE may be disposed on a data path between the external processor (e.g., the processor 200) and the memory core (e.g., the memory cell array 480), may analyze statistical characteristics of the plurality of data input from the external processor or output from the memory core to obtain and store at least one statistical feature value associated with the statistical characteristics, and may transmit the at least one statistical feature value to the external processor. The statistical feature extractor SFE may include a processing unit PU and an internal cache CAC.

Figure 4A:
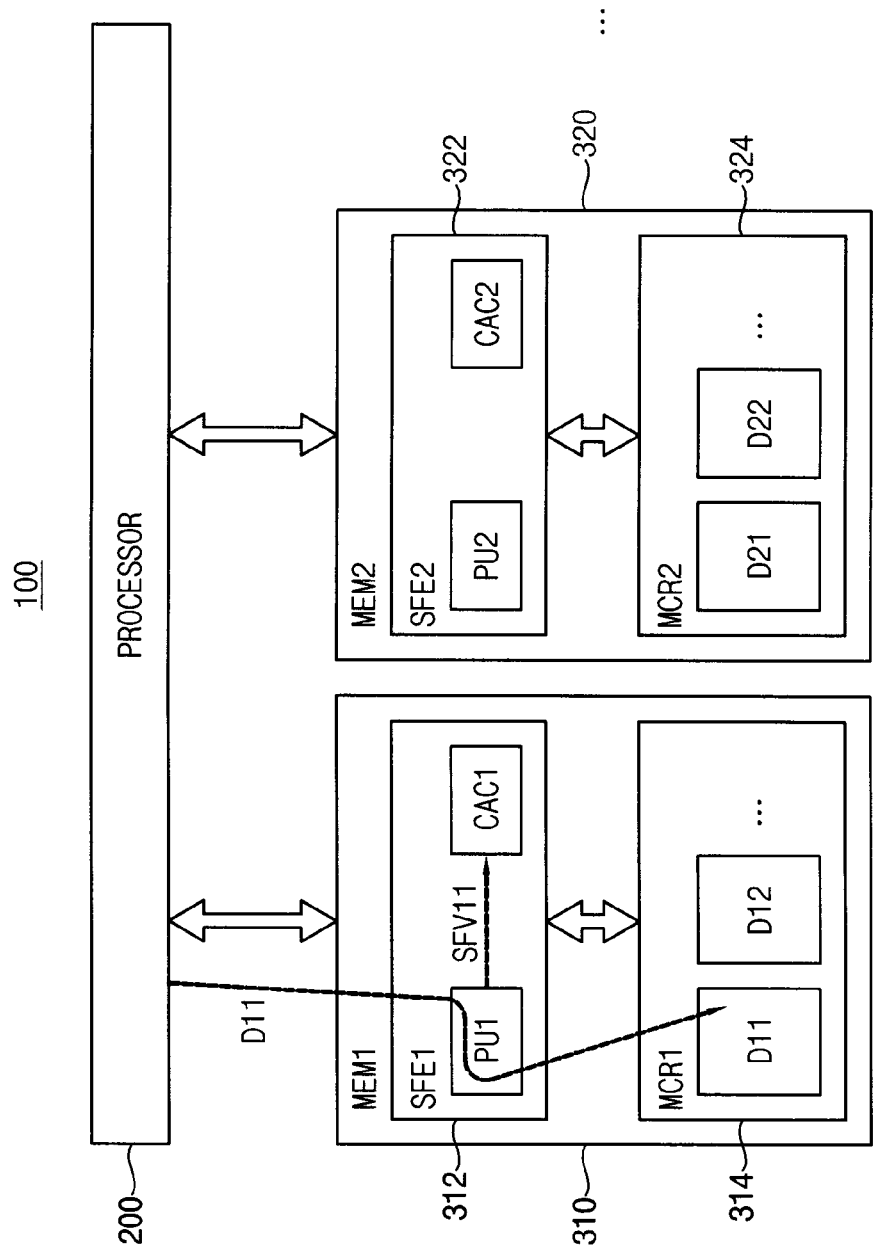

FIGS. 4A and 4B are diagrams for describing an operation of an electronic system according to example embodiments. FIGS. 4A and 4B illustrate an operation of analyzing statistical characteristics of the data D11 among the plurality of data D11, D12, D21 and D22 in FIG. 1.

Referring to FIG. 4A, statistics for the data D11 may be calculated using input/output of the first semiconductor memory device 310.

For example, when the processor 200 is to store the data D11 in the first memory core 314, the first statistical feature extractor 312 may transfer the data D11 received through the first data path DP1 to the first memory core 314 and may substantially simultaneously or concurrently transfer the received data D11 to the first processing element PU1. The first processing element PU1 may analyze statistical characteristics of the received data D11 to calculate and obtain a statistical feature value SFV11. The statistical feature value SFV11 may be stored in the first internal cache CAC1.

Referring to FIG. 4B, the statistics for the data D11 may be calculated during an idle time of the first semiconductor memory device 310.

For example, after the data D11 is provided from the processor 200 through the first data path DP1 and stored in the first memory core 314, the first statistical feature extractor 312 may read the data D11 stored in the first memory core 314 and may transmit the read data D11 to the first processing element PU1 during the idle time of the first memory core 314. The first processing element PU1 may analyze the statistical characteristics of the read data D11 to calculate and obtain the statistical feature value SFV11. The statistical feature value SFV11 may be stored in the first internal cache CAC1.

An operation of analyzing statistical characteristics of at least some of the remaining data D12, D21 and D22 may also be performed based on one of the two schemes described above.

Figure 5:
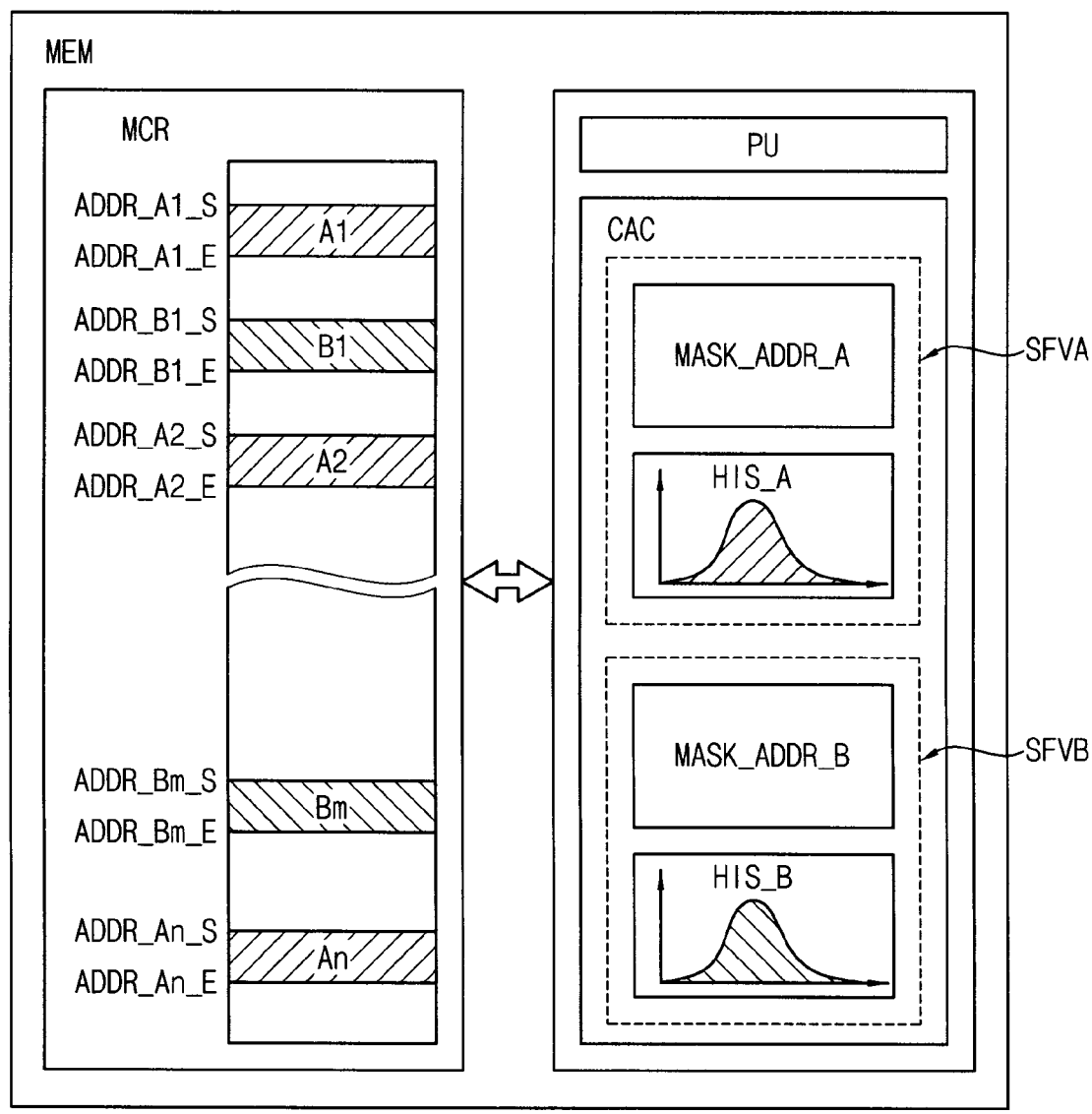
FIG. 5 is a diagram for illustrating operation of a semiconductor memory device according to example embodiments.

FIG. 5 is a diagram for describing an operation of a semiconductor memory device according to example embodiments. For convenience of illustration, an example where the statistical feature value is a histogram will be described in FIG. 5 and subsequent figures.

Referring to FIG. 5, a plurality of data A1, A2, ..., An, B1, ..., Bm stored in a memory core MCR of a semiconductor memory device MEM may be divided into a plurality of data groups. For example, the plurality of data A1~An and B1~Bm may be divided into the data A1~An of a first group and the data B1~Bm of a second group. Data having the same first alphabetic character may be data of the same group. Although only two data groups are illustrated in FIG. 5, example embodiments are not limited thereto, and the number of data groups may be changed according to example embodiments.

A plurality of statistical feature values SFVA and SFVB calculated and obtained by the processing element PU of the statistical feature extractor SFE and stored in the internal cache CAC may include a first statistical feature value SFVA for the data A1~An of the first group and a second statistical feature value SFVB for the data B1~Bm of the second group. For example, the first statistical feature value SFVA may include a first histogram HIS_A, and the second statistical feature value SFVB may include a second histogram HIS_B. Although each of the histograms HIS_A and HIS_B are illustrated in FIG. 5 similar to a distribution curve for convenience of illustration, each of the histograms HIS_A and HIS_B may be one of histograms illustrated in FIGS. 9A, 9B and 9C.

In some example embodiments, the internal cache CAC may additionally store address information of the plurality of data A1~An and B1~Bm, may divide the plurality of data A1~An and B1~Bm and the address information into the plurality of data groups and a plurality of address groups, respectively, and may extract the statistical feature values for the plurality of data A1~An and B1~Bm included in the plurality of data groups, respectively, based on the plurality of address groups. For example, the internal cache CAC may further store first address information MASK_ADDR_A for the data A1~An of the first group and second address information MASK_ADDR_B for the data B1~Bm of the second group. Each of the address information MASK_ADDR_A and MASK_ADDR_B may be referred to as a mask of address.

For example, addresses for regions in which the plurality of data A1~An and B1~Bm are stored may exist in the memory core MCR. For example, the data A1 may be stored in a region from a start address ADDR_A1_S to an end address ADDR_A1_E, the data A2 may be stored in a region from a start address ADDR_A2_S to an end address ADDR_A2_E, and the data An may be stored in a region from a start address ADDR_An_S to an end address ADDR_An_E. Similarly, the data B1 may be stored in a region from a start address ADDR_B1_S to an end address ADDR_B1_E, and the data Bm may be stored in a region from a start address ADDR_Bm_S to an end address ADDR_Bm_E. The first address information MASK_ADDR_A may include the start addresses ADDR_A1_S~ADDR_An_S and the end addresses ADDR_A1_E~ADDR_An_E for the data A1~An of the first group, and the second address information MASK_ADDR_B may include the start addresses ADDR_B1_S~ADDR_Bm_S and the end addresses ADDR_B1_E~ADDR_Bm_E for the data B1~Bm of the second group.

As described above, when analyzing the statistical characteristics, data groups may be defined in the semiconductor memory device MEM, and addresses may be separated in the memory so that the statistical characteristics of data of each group (e.g., a weight distribution for each layer of the neural network system) may be calculated. In some example embodiments, an operation of separating the addresses for each group may include an operation of classifying the addresses into groups for calculating the statistical characteristics on the processing element PU and an operation of classifying the addresses in the plurality of processing elements PUs for each physically separated address defined in the memory core MCR.

FIGS. 6, 7, 8, 9A, 9B and 9C are diagrams illustrating operation of electronic systems according to example embodiments. Features similar those described above with reference to FIG. 4A will be omitted.

Figure 6:
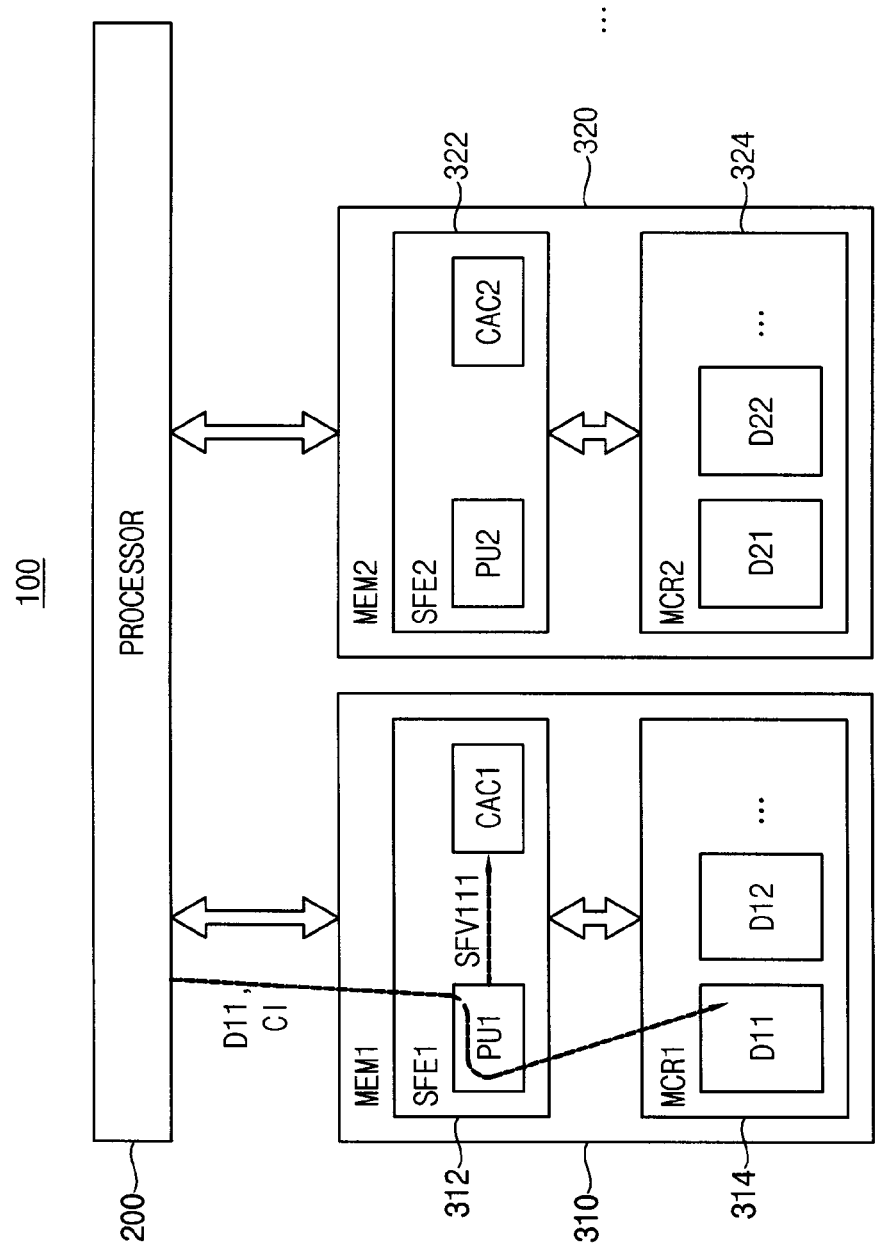

Referring to FIG. 6, the statistics for the data D11 may be calculated using the input/output of the first semiconductor memory device 310, and condition information CI may be additionally used.

For example, the first statistical feature extractor 312 may transfer the data D11 and the condition information CI received through the first data path DP1 to the first processing element PU1, and the first processing element PU1 may calculate and obtain a statistical feature value SFV111 based on the received data D11 and the received condition information CI. The statistical feature value SFV111 may be stored in the first internal cache CAC1.

In some example embodiments, the statistical feature value SFV111 may include a histogram of the data D11, and the condition information CI may include at least one condition associated with the histogram. For example, the condition information CI may include information such as a minimum value, a maximum value, a fractional length, a data type, etc. for excluding some of the data D11 from the histogram, and the first processing element PU1 may obtain an appropriate or suitable histogram based on the condition information CI.

Figure 7:
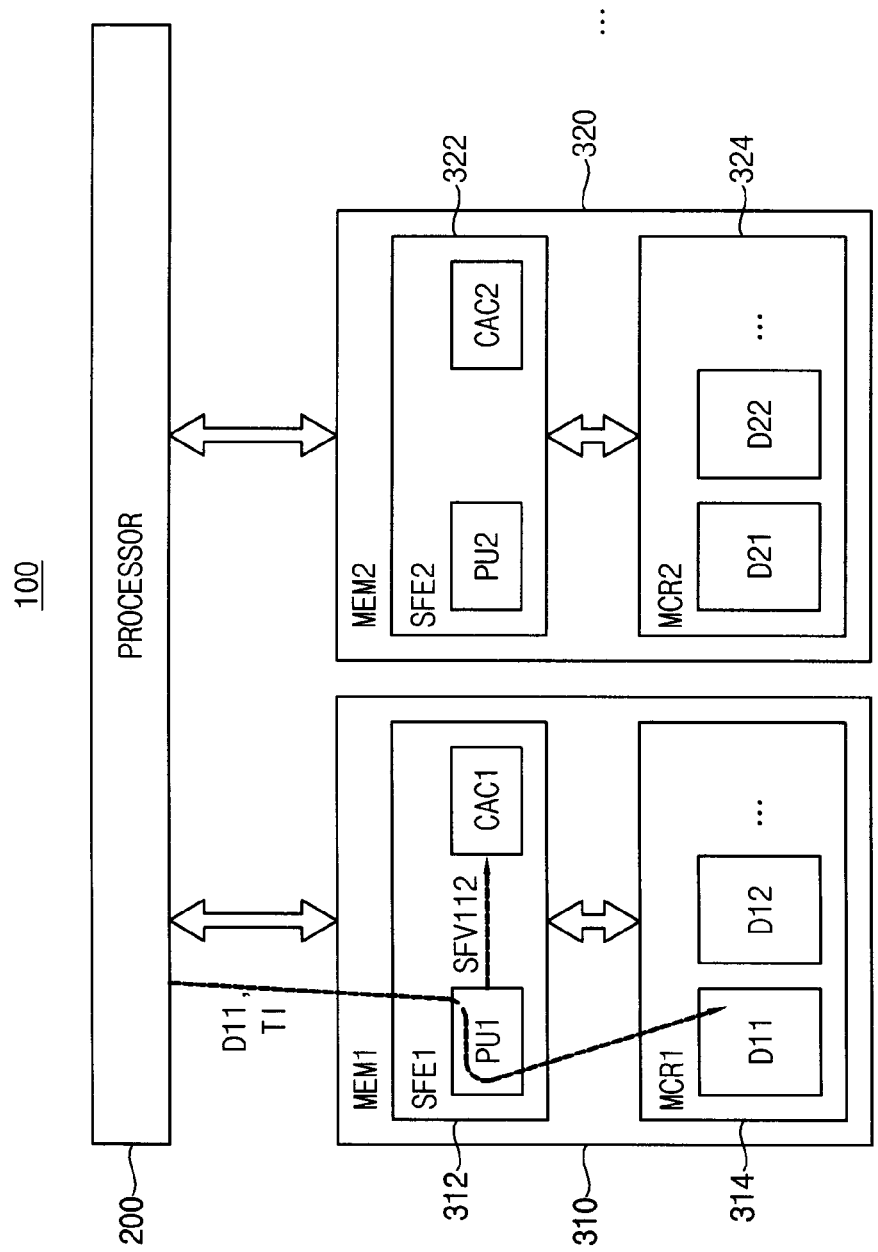

Referring to FIG. 7, the statistics for the data D11 may be calculated using the input/output of the first semiconductor memory device 310, and type information TI may be additionally used.

For example, the first statistical feature extractor 312 may transfer the data D11 and the type information TI received through the first data path DP1 to the first processing element PU1, and the first processing element PU1 may calculate and obtain a statistical feature value SFV112 based on the received data D11 and the received type information TI. The statistical feature value SFV112 may be stored in the first internal cache CAC1.

In some example embodiments, the statistical feature value SFV112 may include a histogram of the data D11, and the type information TI may include a type of input data. For example, the type information TI may include information whether the input data is signed data or unsigned data, information whether the input data is integer data or floating point data, information of a bit size, etc., and the first processing element PU1 may obtain an appropriate or suitable histogram based on the type information TI.

Referring to FIG. 8, the statistics for the data D11 may be calculated using the input/output of the first semiconductor memory device 310, and additional data D11A may be used together.

For example, the first statistical feature extractor 312 may transfer the data D11 and the additional data D11A received through the first data path DP1 to the first processing element PU1, and the first processing element PU1 may calculate and obtain a statistical feature value SFV11A based on the received data D11 and the received additional data D11A. The statistical feature value SFV11A may be stored in the first internal cache CAC1.

In some example embodiments, the statistical feature value SFV11A may include a histogram of the data D11, and the additional data D11A may be data to be additionally included in the histogram other than the data D11. As will be described with reference to FIGS. 9A, 9B and 9C, the first processing element PU1 may obtain an appropriate or suitable histogram based on the data D11 and the additional data D11A.

Figure 9A:
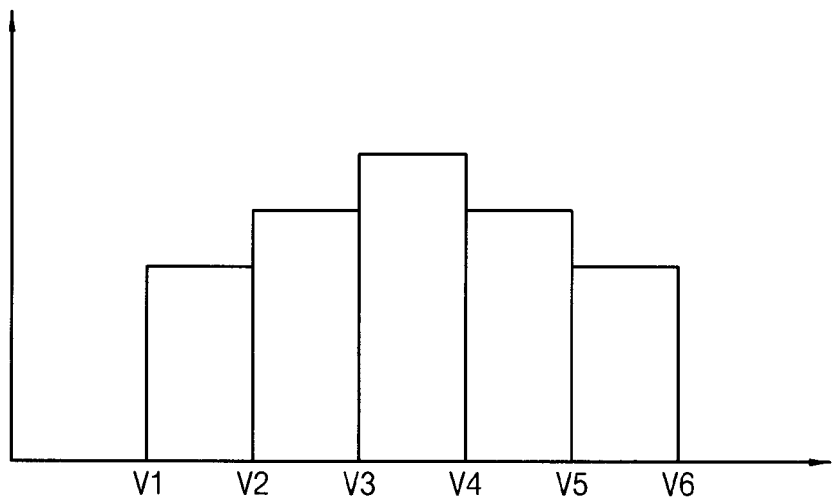

Referring to FIG. 9A, an example of a histogram based on the data D11 is illustrated. The histogram of FIG. 9A includes a first interval of V1~V2, a second interval of V2~V3, a third interval of V3~V4, a fourth interval of V4~V5 and a fifth interval of V5~V6, and the entire range of the histogram of FIG. 9A is from V1 to V6.

Figure 9B:
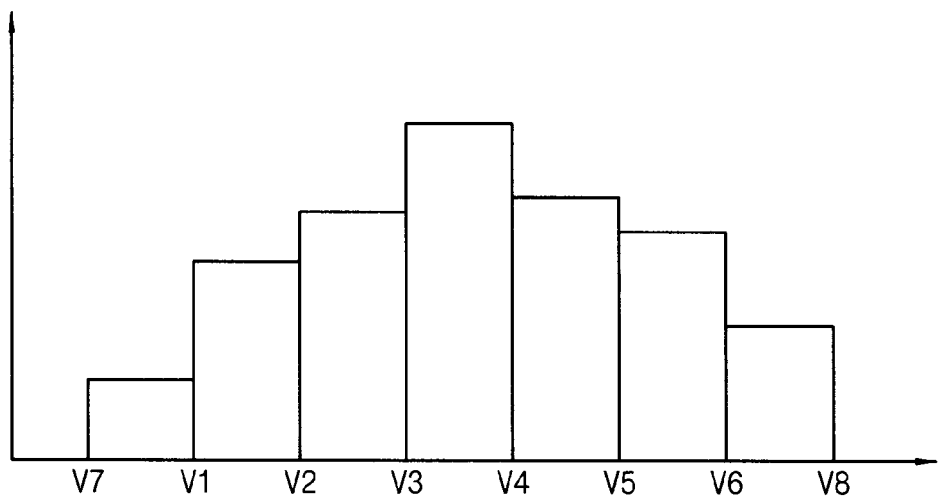

Referring to FIG. 9B, when the additional data D11A is to be further included in the histogram of FIG. 9A, the first processing element PU1 may modify the entire range of the histogram based on the additional data D11A. Compared with the histogram of FIG. 9A, a sixth interval of V7~V1 and a seventh interval of V6~V8 are added to a histogram of FIG. 9B, and the entire range of the histogram of FIG. 9B is increased to an interval from V7 to V8. However, a range (or width) of each interval of the histogram is unchanged and maintained in FIGS. 9A and 9B. In other words, the histogram of FIG. 9A and the histogram of FIG. 9B may have substantially the same precision (or resolution).

Figure 9C:
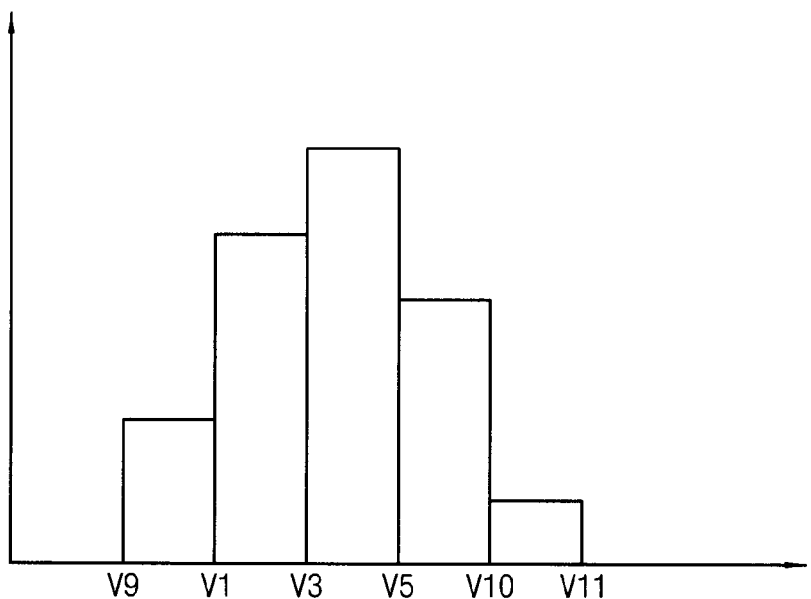

Referring to FIG. 9C, when the additional data D11A is to be further included in the histogram of FIG. 9A, the first processing element PU1 may modify a range of each interval of the histogram based on the additional data D11A. Compared with the histogram of FIG. 9A, a histogram of FIG. 9C includes an eighth interval of V9~V1, a ninth interval of V1~V3, a tenth interval of V3~V5, an eleventh interval of V5~V10 and a twelfth interval of V10~V11, and the entire range of the histogram of FIG. 9C is increased from V9 to V11. In other words, the histogram of FIG. 9A and the histogram of FIG. 9C may have different precisions (or resolutions). When generating a histogram, the precision or resolution may be modified depending on distribution of the input data. Thus, when data out of the entire range of a histogram is input, the precision or resolution of the histogram may be modified, and currently accumulated data and newly input data may be re-accumulated based on the modified precision or resolution.

In some example embodiments, when modifying the range of each interval of the histogram based on the additional data D11A, the range of each interval may be changed by merging two or more adjacent intervals among the plurality of intervals of the histogram of FIG. 9A. For example, the first interval V1~V2 and the second interval V2~V3 of the histogram of FIG. 9A may be merged to form the ninth interval V1~V3 of the histogram of FIG. 9C.

Although examples of modifying the histogram have been described with reference to FIGS. 9A, 9B and 9C, example embodiments are not limited thereto, and the histogram may be modified based on at least one of various schemes.

When generating the histogram by classifying the addresses for each region of the input data described with reference to FIG. 5, the histogram of the existing region may be reset when data is rewritten into existing addresses.

Although examples of using the input/output of the first semiconductor memory device 310 are described with reference to FIGS. 6, 7 and 8, example embodiments are not limited thereto, and the examples of FIGS. 6, 7 and 8 may be applied when using the idle time of the first semiconductor memory device 310 described with reference to FIG. 4B. In addition, two or more examples described with reference to FIGS. 6, 7 and 8 may be combined to implement the semiconductor memory device and the electronic system according to example embodiments.

Figure 10:
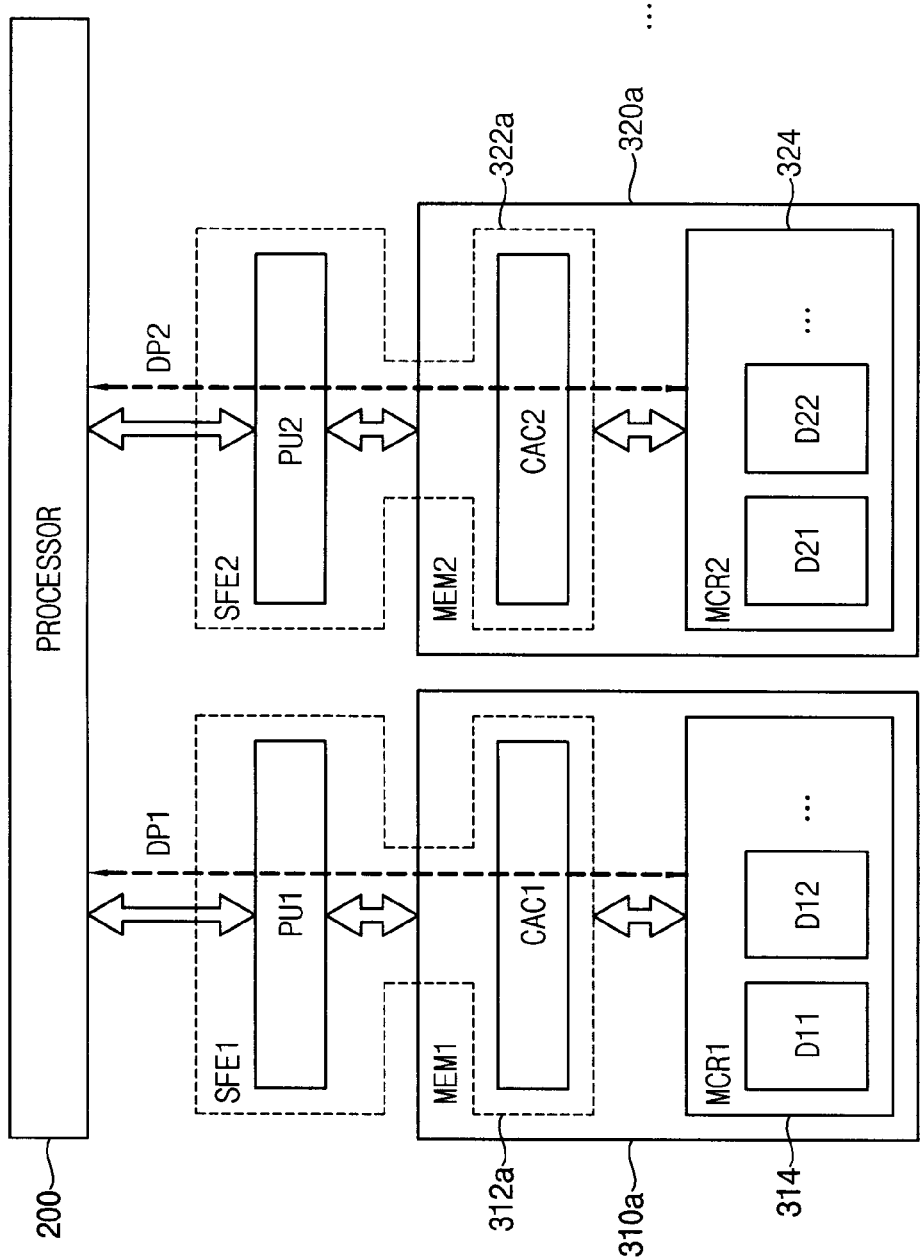
Figure 11:
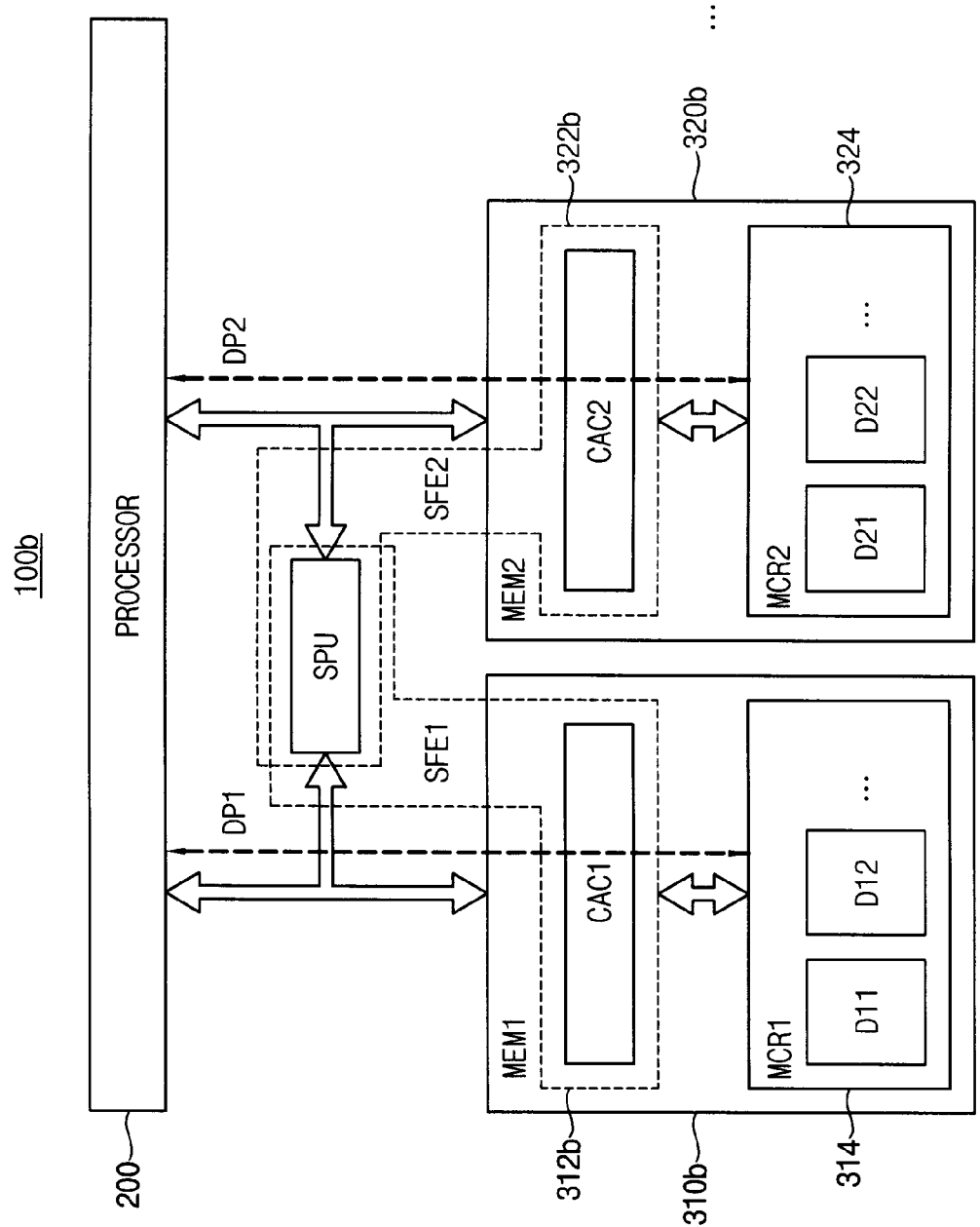

FIGS. 10, 11 and 12 are block diagrams illustrating an electronic system including a semiconductor memory device according to example embodiments. Features similar those described above with reference to FIG. 1 will be omitted.

Referring to FIG. 10, an electronic system 100a according to an example embodiment includes at least one processor 200 and a plurality of semiconductor memory devices 310a, 320a, . . . .

The electronic system 100a of FIG. 10 may be substantially the same as the electronic system 100 of FIG. 1, except that configurations of statistical feature extractors 312a and 322a included in the plurality of semiconductor memory devices 310a and 320a are partially changed in FIG. 10.

The first statistical feature extractor 312a may include a first processing unit PU1 and a first internal cache CAC1. The first processing element PU1 may be disposed outside the first semiconductor memory device 310a, and the first internal cache CAC1 may be disposed inside the first semiconductor memory device 310a. Similarly, the second statistical feature extractor 322a may include a second processing unit PU2 and a second internal cache CAC2. The second processing unit PU2 may be disposed outside the second semiconductor memory device 320a, and the second internal cache CAC2 may be disposed inside the second semiconductor memory device 320a.

Referring to FIG. 11, an electronic system 100b according to an example embodiment includes at least one processor 200 and a plurality of semiconductor memory devices 310b, 320b, . . . .

The electronic system 100b of FIG. 11 may be substantially the same as the electronic system 100 of FIG. 1, except that configurations of statistical feature extractors 312b and 322b included in the plurality of semiconductor memory devices 310b and 320b are partially changed in FIG. 11.

At least one element (e.g., the processing unit) included in the first statistical feature extractor 312b and the second statistical feature extractor 322b may be shared by the first statistical feature extractor 312b and the second statistical feature extractor 322b. For example, the first statistical feature extractor 312b may include a shared processing unit SPU disposed outside the first semiconductor memory device 310b and a first internal cache CAC1 disposed inside the first semiconductor memory device 310b. The second statistical feature extractor 322b may include the shared processing element SPU disposed outside the second semiconductor memory device 320b and a second internal cache CAC2 disposed inside the second semiconductor memory device 320b.

Referring to FIG. 12, an electronic system 100c according to an example embodiment includes at least one processor 200 and a plurality of semiconductor memory devices 310, 320, . . . , and may further include an operator 500.

The electronic system 100c of FIG. 12 may be substantially the same as the electronic system 100 of FIG. 1, except that the electronic system 100c further includes the operator 500.

The operator 500 may merge the at least one first statistical feature value stored in the first internal cache CAC1 of the first semiconductor memory device 310 and the at least one second statistical feature value stored in the second internal cache CAC2 of the second semiconductor memory device 320. For example, when some data of the same group are stored in the first semiconductor memory device 310 and the other data of the same group are stored in the second semiconductor memory device 320, it is necessary to merge statistical feature values to obtain one statistical feature value. Thus, the operator 500 may be used to merge the statistical feature values.

As illustrated in FIG. 12, the operator 500 may be disposed outside the processor 200 and the first and second semiconductor memory devices 310 and 320.

Figure 13A:
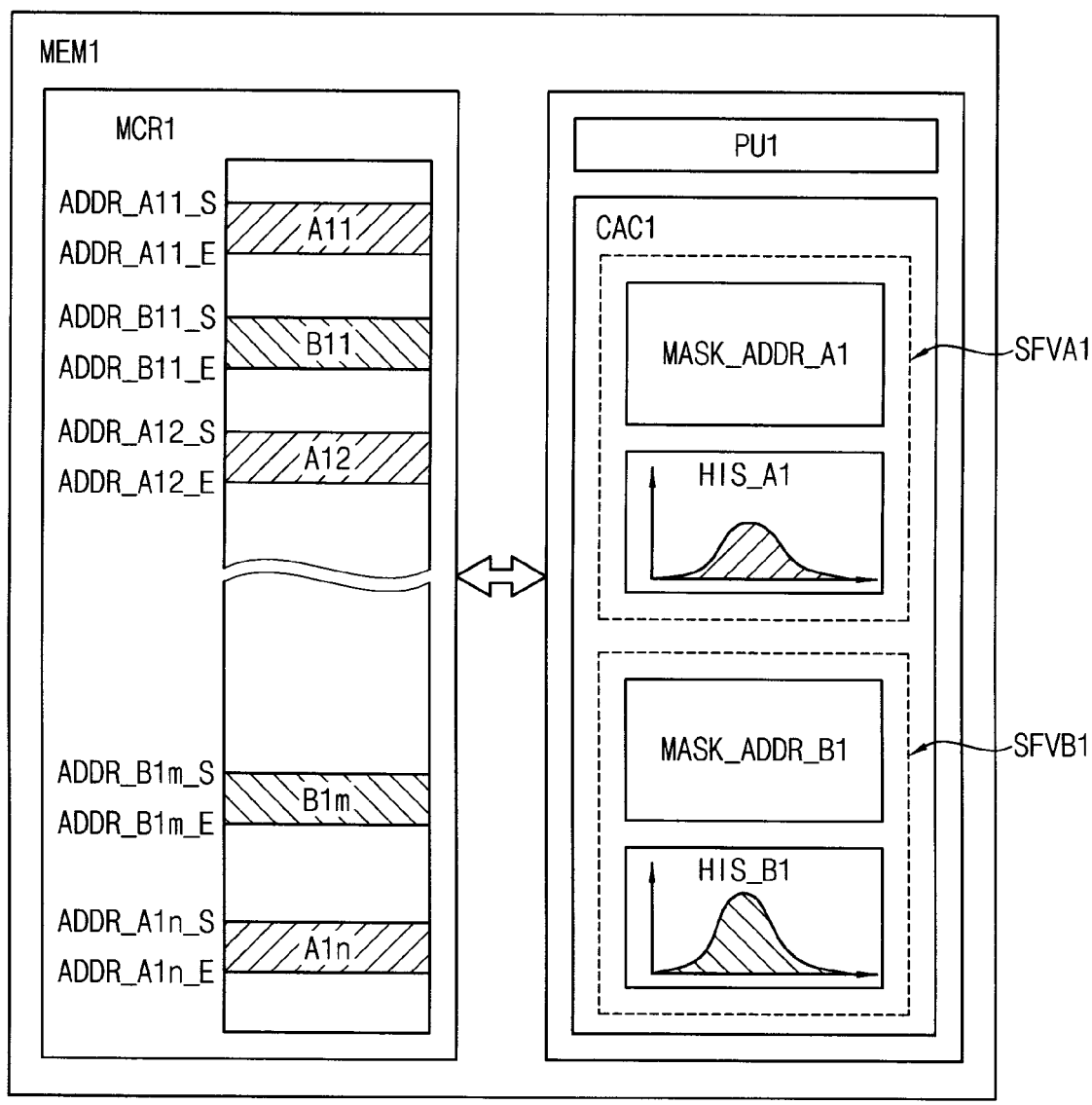
FIGS. 13A, 13B and 13C are diagrams illustrating operation of the electronic system of FIG. 12.
Figure 13B:
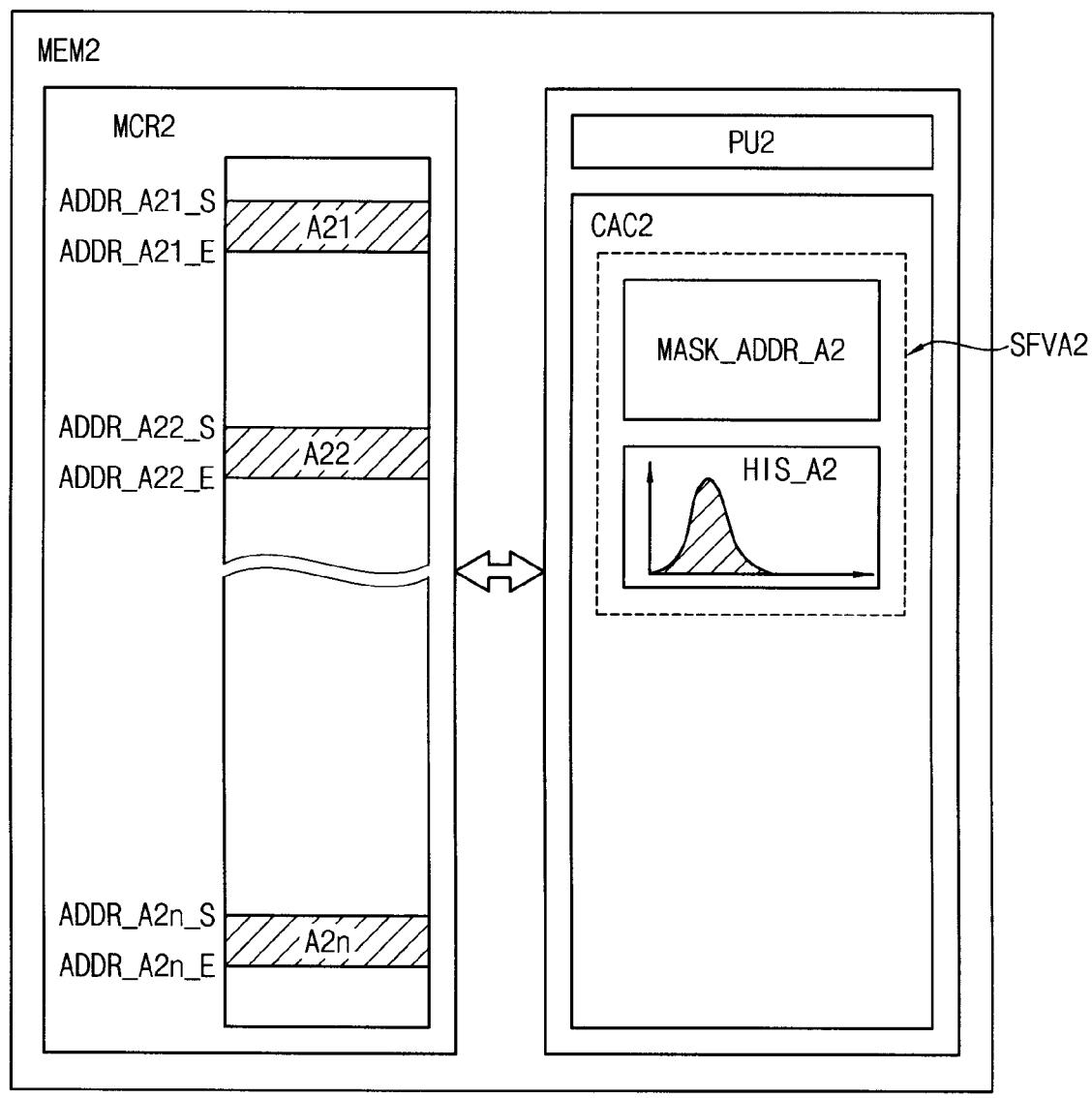
Figure 13C:
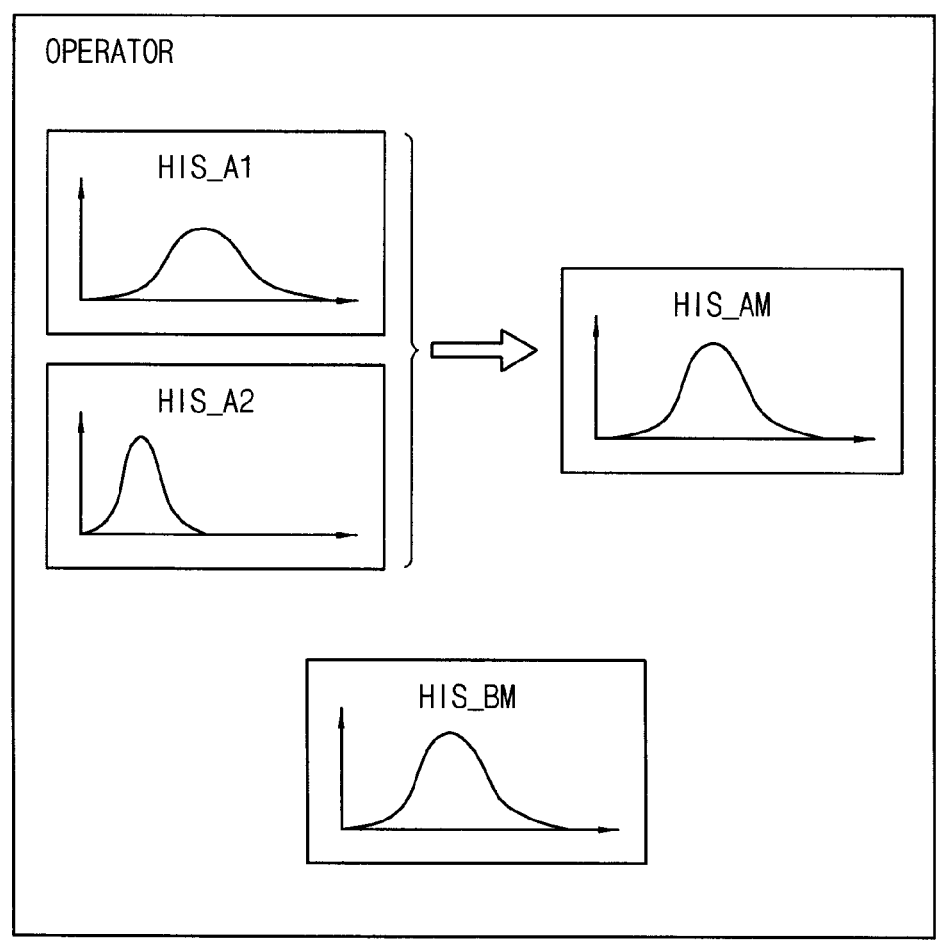

FIGS. 13A, 13B and 13C are diagrams for describing an operation of the electronic system of FIG. 12. Features similar those described above with reference to FIG. 5 will be omitted.

Referring to FIG. 13A, some data A11, A12, ..., A1n of a first group and data B11, ..., B1m of a second group may be stored in a first memory core MCR1 of a first semiconductor memory device MEM1. A statistical feature value SFVA1 (e.g., a histogram HIS_A1) for the some data A11~A1n of the first group and a statistical feature value SFVB1 (e.g., a histogram HIS_B1) for the data B11~B1m of the second group may be stored in a first internal cache CAC1 of the first semiconductor memory device MEM1. In addition, address information MASK_ADDR_A1 (e.g., start addresses ADDR_A11_S, ADDR_A12_S, ..., ADDR_A1n_S and end addresses ADDR_A11_E, ADDR_A12_E, ADDR_A1n_E) for the some data A11~A1n of the first group and address information MASK_ADDR_B1 (e.g., start addresses ADDR_B11_S, ADDR_B1m_S and end addresses ADDR_B11_E, ..., ADDR_B1m_E) for the data B11~B1m of the second group may be additionally stored in the first internal cache CAC1.

Referring to FIG. 13B, the other data A21, A22, ..., A2n of the first group may be stored in a second memory core MCR2 of a second semiconductor memory device MEM2. A statistical feature value SFVA2 (e.g., a histogram HIS_A2) for the other data A21~A2n of the first group may be stored in a second internal cache CAC2 of the second semiconductor memory device MEM2. In addition, address information MASK_ADDR_A2 (e.g., start addresses ADDR_A21_S, ADDR_A22_S, ADDR_A2n_S and end addresses ADDR_A21_E, ADDR_A22_E, ADDR_A2n_E) for the other data A21~A2n of the first group may be additionally stored in the second internal cache CAC2.

Referring to FIG. 13C, the operator 500 may merge the histograms HIS_A1 and HIS_A2 that correspond to the statistical feature values SFVA1 and SFVA2 for all of the data A11~A1n and A21~A2n of the first group provided from the first and second internal caches CAC1 and CAC2 to obtain a first merged histogram HIS_AM. Because all of the data B11~B1m of the second group are stored only in the first semiconductor memory device MEM1, the operator 500 may obtain the histogram HIS_B1 that corresponds to the statistical feature value SFVB1 stored in the first internal cache CAC1 as a second merged histogram HIS_BM.

Figure 14:
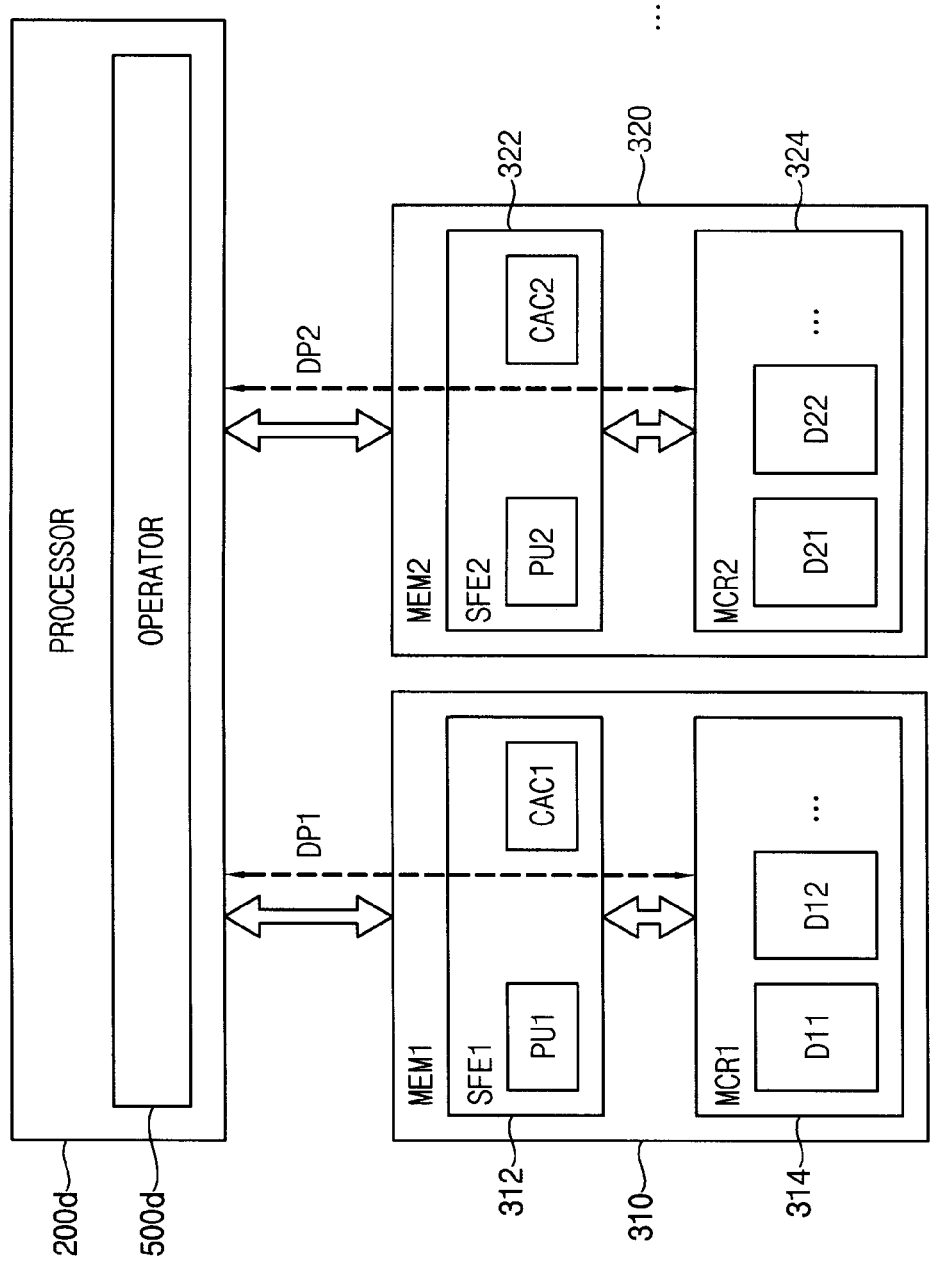
FIGS. 14, 15 and 16 are block diagrams illustrating electronic systems including a semiconductor memory device according to example embodiments.
Figure 15:
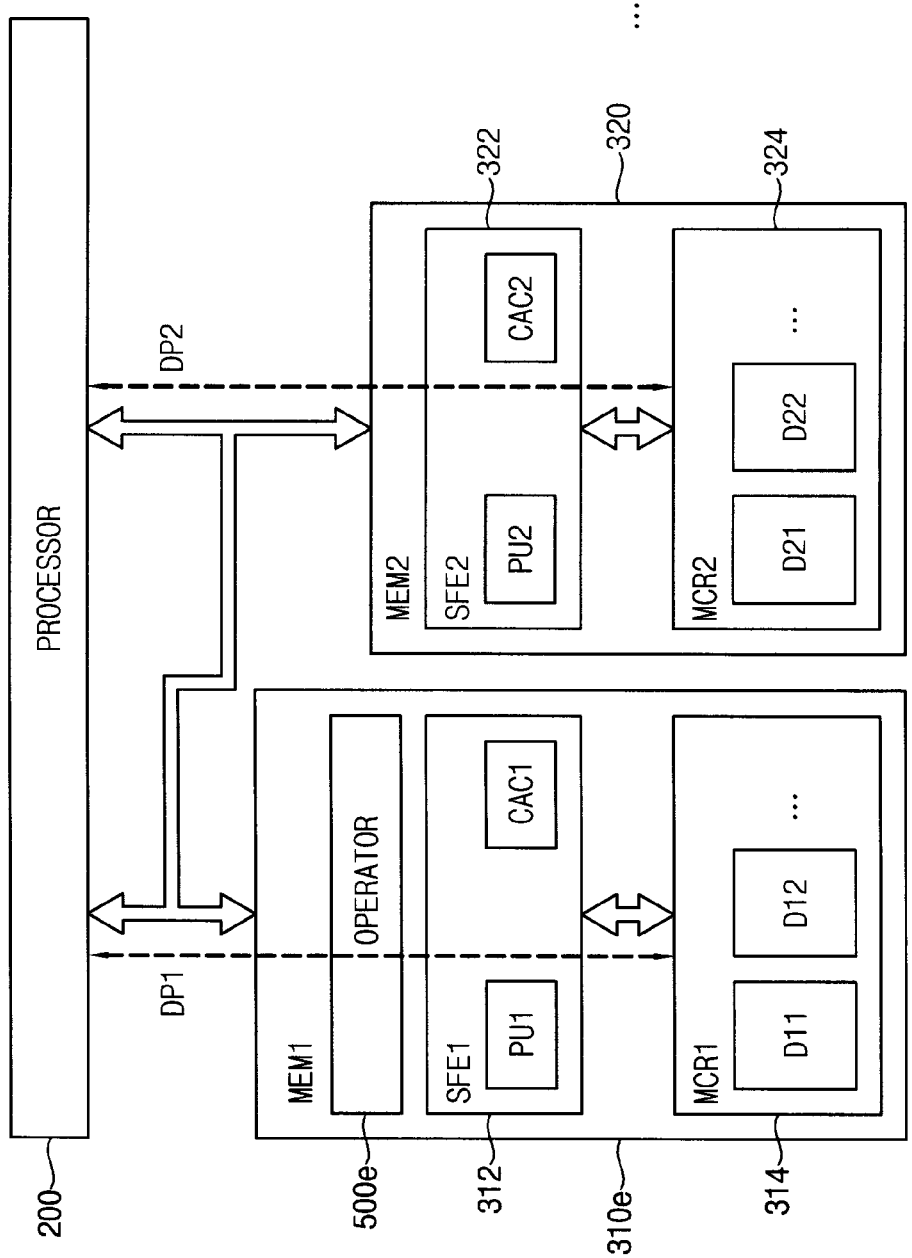
Figure 16:
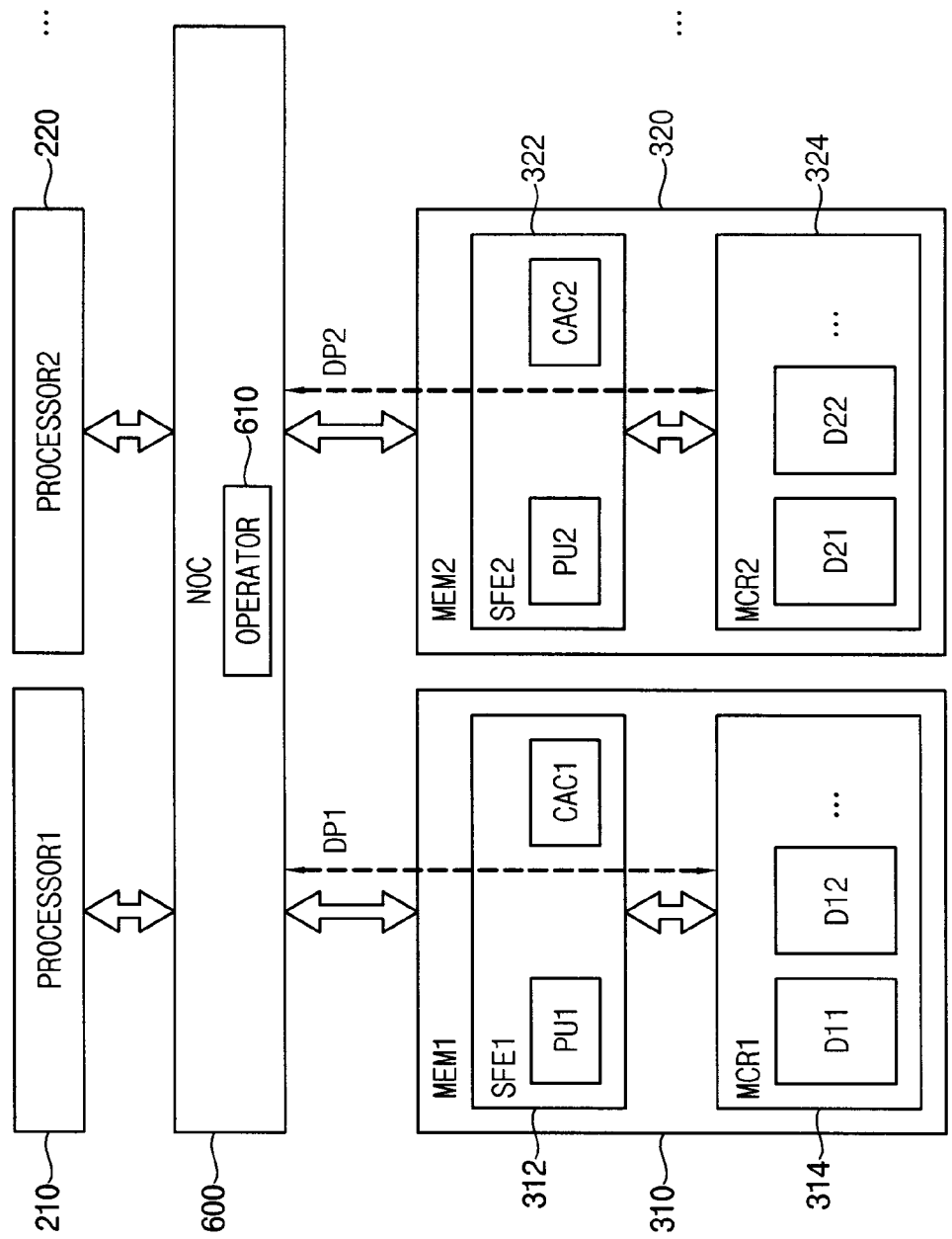

FIGS. 14, 15 and 16 are block diagrams illustrating an electronic system including a semiconductor memory device according to example embodiments. Features similar those described above with reference to FIGS. 1 and 12 will be omitted.

Referring to FIG. 14, an electronic system 100d includes at least one processor 200d and a plurality of semiconductor memory devices 310, 320, ....

The electronic system 100d of FIG. 14 may be substantially the same as the electronic system 100c of FIG. 12, except that an arrangement of an operator 500d is changed in FIG. 14.

As illustrated in FIG. 14, the operator 500d may be disposed inside the processor 200d.

Referring to FIG. 15, an electronic system 100e according to an example embodiment includes at least one processor 200 and a plurality of semiconductor memory devices 310e, 320, ....

The electronic system 100e of FIG. 15 may be substantially the same as the electronic system 100c of FIG. 12, except that an arrangement of an operator 500e is changed in FIG. 15.

As illustrated in FIG. 15, the operator 500e may be disposed inside the first semiconductor memory device 310e. The operator may be disposed inside the second semiconductor memory device 320 according to example embodiments.

Referring to FIG. 16, an electronic system 100f according to an example embodiment includes a plurality of processors 210, 220, ... and a plurality of semiconductor memory devices 310, 320, ..., and may further include an NoC (Network-on Chip) 600.

The electronic system 100f of FIG. 16 may be substantially the same as the electronic system 100 of FIG. 1, except that the electronic system 100f of FIG. 16 includes the plurality of processors 210 and 220 and further includes the NoC 600.

Each of the plurality of processors 210 and 220 performs operations on some or all of a plurality of data D11, D12, ..., D21, D22, .... According to example embodiments, the plurality of processors 210 and 220 may be homogeneous resources or heterogeneous resources.

When integrating and implementing various modules such as the processors 210 and 220, a hardware accelerator, and the semiconductor memory devices 310 and 320, an on-chip communication medium for transmitting and receiving data between the modules should be required. The NoC 600 represents a technology and or a chip/module implemented by the technology through which a distributed data transfer is enabled between modules by arranging routers that relay data transmissions inside a chip.

The NoC 600 may be disposed between the plurality of processors 210 and 220 and the plurality of semiconductor memory devices 310 and 320 to relay data transmission. The NoC 600 may include an operator 610 that merges at least some of a plurality of statistical feature values stored in the internal caches CAC1 and CAC2 of the semiconductor memory devices 310 and 320. The operator 610 may perform an operation similar to the operator described with reference to FIGS. 12 through 15.

Figure 17:
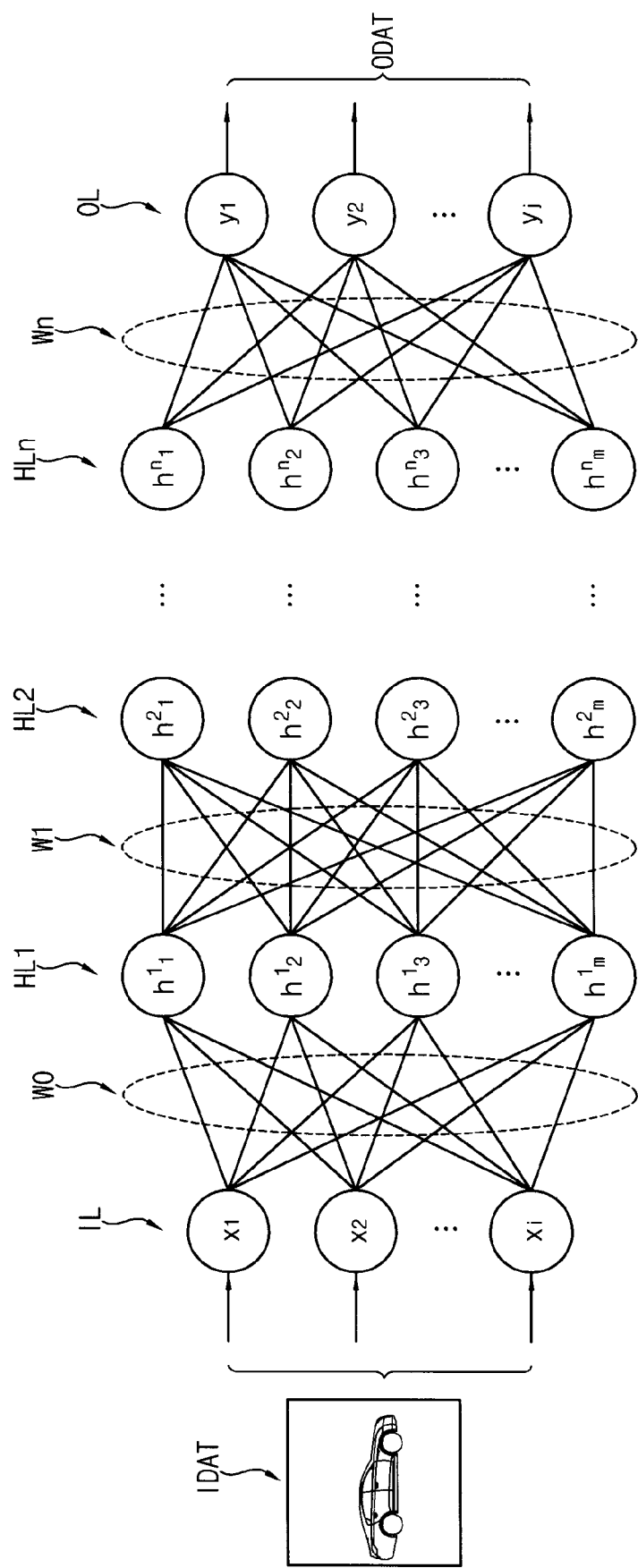
FIG. 17 is a diagram illustrating an example of a neural network system that is driven by an electronic system according to example embodiments.

FIG. 17 is a diagram for describing an example of a neural network system that is driven by an electronic system according to example embodiments.

Referring to FIG. 17, a general neural network may include an input layer IL, a plurality of hidden layers HL1, HL2, ..., HLn and an output layer OL.

The input layer IL may include i input nodes $x_1$, $x_2$, ..., $x_i$, where i is a natural number. Input data (e.g., vector input data) IDAT whose length is i may be input to the input nodes $x_1$, $x_2$, ..., $x_i$ such that each element of the input data IDAT is input to a respective one of the input nodes $x_1$, $x_2$, ..., $x_i$.

The plurality of hidden layers HL1, HL2, ..., HLn may include n hidden layers, where n is a natural number, and may include a plurality of hidden nodes $h^1_1$, $h^1_2$, $h^1_3$, ..., $h^1_m$, $h^2_1$, $h^2_2$, $h^2_3$, ..., $h^2_m$, $h^n_1$, $h^n_2$, $h^n_3$, ..., $h^n_m$. For example, the hidden layer HL1 may include m hidden nodes $h^1_1$, $h^1_2$, $h^1_3$, ..., $h^1_m$, the hidden layer HL2 may include m hidden nodes $h^2_1$, $h^2_2$, $h^2_3$, ..., $h^2_m$, and the hidden layer HLn may include m hidden nodes $h''_1, h''_2, h^h_3, \ldots, h''_m$, where m is a natural number.

The output layer OL may include j output nodes $y_1, y_2, \ldots, y_j$, where j is a natural number. Each of the output nodes $y_1, y_2, \ldots, y_j$ may correspond to a respective one of classes to be categorized. The output layer OL may output values (e.g., class scores or simply scores) or output data ODAT associated with the input data IDAT for each of the classes. The output layer OL may be referred to as a fully-connected layer and may indicate, for example, a probability that the input data IDAT corresponds to a car.

A structure of the neural network illustrated in FIG. 17 may be represented by information on branches (or connections) between nodes illustrated as lines, and weights or weighted values W0, W1, ..., Wn assigned to the branches, respectively. Nodes within one layer may not be connected to one another, but nodes of different layers may be fully or partially connected to one another.

Each node (e.g., the node $h^1_1$) may receive an output of a previous node (e.g., the node $x_1$), may perform a computing operation, computation or calculation on the received output, and may output a result of the computing operation, computation or calculation as an output to a next node (e.g., the node $h^2_1$). Each node may calculate a value to be output by applying the input to a specific function, e.g., a nonlinear function.

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

As described above, the plurality of data stored in the semiconductor memory device according to example embodiments may correspond to the weights W0~Wn, and thus the data processing efficiency may be improved or enhanced when the neural network system is driven by the semiconductor memory device and the electronic system according to example embodiments. However, example embodiments are not limited thereto. For example, the plurality of data stored in the semiconductor memory device according to example embodiments may correspond to inputs/outputs of the plurality of layers, and the semiconductor memory device and the electronic system according to example embodiments may be used to calculate and obtain statistical characteristics of a plurality of I/O feature maps included in the plurality of layers.

Figure 18:
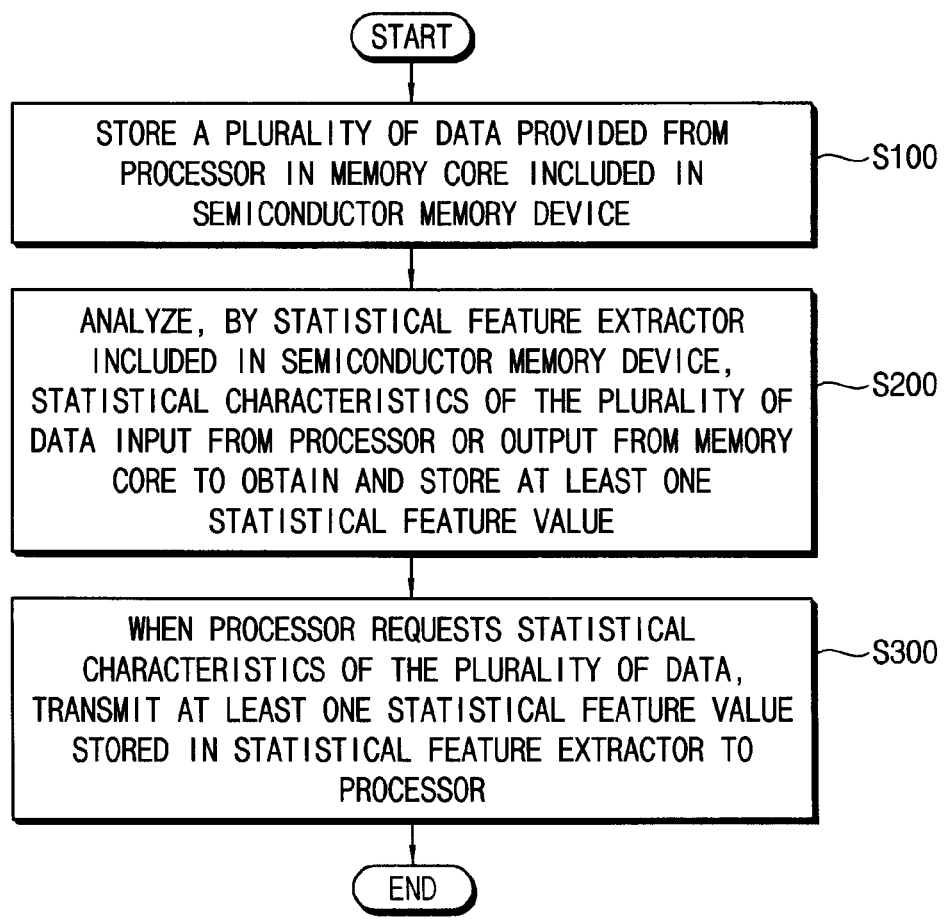
FIG. 18 is a flowchart illustrating a method of operating a semiconductor memory device according to example embodiments.

FIG. 18 is a flowchart illustrating a method of operating a semiconductor memory device according to example embodiments.

An interface for transmitting statistical characteristics to a processor is illustrated. For example, the statistical characteristics may be transmitted by writing down an address in a memory or through a separate serial interface.

Referring to FIGS. 1 and 18, in a method of operating a semiconductor memory device according to example embodiments, a plurality of data D11 and D12 provided from an external processor 200 are stored in a memory core 314 included in a semiconductor memory device 310 (step S100). Statistical characteristics of the plurality of data D11 and D12 input from the external processor 200 or output from the memory core 314 are analyzed by a statistical feature extractor 312 included in the semiconductor memory device 310 and disposed on a data path DP1 between the external processor 200 and the memory core 314 to obtain and store at least one statistical feature value associated with the statistical characteristics (step S200). When the external processor 200 requests the statistical characteristics of the plurality of data D11 and D12, the at least one statistical feature value stored in the statistical feature extractor 312 is transmitted to the external processor 200 instead of transmitting the plurality of data D11 and D12 to the external processor 200 (step S300).

As described above, the semiconductor memory device according to example embodiments may include the statistical feature extractor for analyzing the statistical characteristics of data received from the processor or stored therein. Accordingly, the overhead of the data input and output between the processor and the semiconductor memory device and the data operation/processing of the processor may be reduced, the statistical characteristics of the data may be quickly and efficiently obtained, and the data processing efficiency may be improved or enhanced.

The present disclosure may be applied to various semiconductor memory devices and neural network systems that perform optical fingerprint recognition. For example, the present disclosure may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

At least one of the components, elements, modules or units represented by a block as illustrated in FIGS. 1, 2A, 2B, 2C, 2D, 2E, 2F, 3, 4A, 4B, 5-8, 10-12, 13A, 13B, 13C and 14-16 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A semiconductor memory device comprising:
   a memory core comprising a plurality of memory cells configured to store a plurality of data received from an external processor;
   an internal cache; and
   a processor disposed on a data path between the external processor and the memory core, the processor being configured to:
      access the plurality of data via the data path while the external processor is storing the plurality of data in the memory core, and access the plurality of data from the memory core during an idle time of the memory core after the plurality of data is stored in the memory core;
      analyze statistical characteristics of the plurality of data,
      identify at least one first statistical feature value associated with the statistical characteristics corresponding to a first data group of the plurality of data,
      identify at least one second statistical feature value associated with the statistical characteristics corresponding to a second data group of the plurality of data,
      concurrently store the at least one first statistical feature value, first address information of the first data group, the at least one second statistical feature value and second address information of the second data group in the internal cache, and
      transmit the at least one first statistical feature value or the at least one second statistical feature value to the external processor.

2. The semiconductor memory device of claim 1, wherein the internal cache is further configured to transmit the at least one first statistical feature value to the external processor based on a first request of the external processor, and transmit the at least one second statistical feature value to the external processor based on a second request of the external processor.

3. The semiconductor memory device of claim 2, wherein the internal cache is further configured to:
   store address information of the plurality of data stored in the memory core.

4. The semiconductor memory device of claim 3, wherein the at least one first statistical feature value and the at least one second statistical feature value are calculated without additional latency by snooping the data while the data is transmitted to extract the at least one first statistical feature value and the at least one second statistical feature value.

5. The semiconductor memory device of claim 2, wherein the processor comprises a Processing-In-Memory (PIM) device or a Field Programmable Gate Array (FPGA) device.

6. The semiconductor memory device of claim 1, wherein the at least one first statistical feature value comprises:
   a number of the plurality of data in the first data group, a histogram of the plurality of data in the first data group, a maximum value of the plurality of data in the first data group, a minimum value of the plurality of data in the first data group, an average value of the plurality of data in the first data group, a median value of the plurality of data in the first data group, a variance of the plurality of data in the first data group, a standard deviation of the plurality of data in the first data group and a fractional length of the plurality of data in the first data group, or
   an intermediate result value for calculating the number of the plurality of data in the first data group, the histogram, the maximum value, the minimum value, the average value, the median value, the variance, the standard deviation and the fractional length.

7. The semiconductor memory device of claim 1, wherein the plurality of data represents a plurality of weights or a plurality of input/output (I/O) feature maps in a plurality of layers of a neural network system.

8. The semiconductor memory device of claim 1, wherein the at least one first statistical feature value comprises a histogram of the plurality of data of the first data group, and
   wherein the processor is further configured to further receive condition information associated with the histogram from the external processor, and obtain the histogram based on the condition information and the plurality of data.

9. The semiconductor memory device of claim 1, wherein the at least one first statistical feature value comprises a histogram of the plurality of data of the first data group, and
   wherein the processor is further configured to further receive type information associated with the plurality of data of the first data group from the external processor, and obtain the histogram based on the type information and the plurality of data.

10. The semiconductor memory device of claim 1, wherein the at least one first statistical feature value comprises a histogram of the plurality of data of the first data group, and
    wherein the processor is further configured to, based on additional data of the first data group not included in intervals of the histogram being further received, modify an entire range of the histogram based on the additional data.

11. The semiconductor memory device of claim 1, wherein the at least one first statistical feature value comprises a histogram of the plurality of data, and
    wherein the processor is further configured to, based on additional data to be included in the histogram being further received, modify a range of each interval of the histogram based on the additional data.

12. An electronic system comprising:
    a processor; and
    a plurality of semiconductor memory devices configured to store a plurality of data provided from the processor,
       wherein a first semiconductor memory device among the plurality of semiconductor memory devices comprises:

a first memory core comprising a plurality of first memory cells that store first data among the plurality of data;

a first internal cache; and a first memory device processor disposed on a first data path between the processor and the first memory core, and wherein the first memory device processor is configured to access the first data via the first data path while the processor is storing the plurality of data in the first memory core, access the plurality of data from the memory core during an idle time of the first memory core after the plurality of data is stored in the first memory core, analyze first statistical characteristics of the first data, identify at least one first statistical feature value associated with the first statistical characteristics corresponding to a first data group of the first data and at least one second statistical feature value associated with the first statistical characteristics corresponding to a second data group of the first data, concurrently store the at least one first statistical feature value, first address information of the first data group, the at least one second statistical feature value and second address information of the second data group, and transmit the at least one first statistical feature value or the at least one second statistical feature value to the processor.

13. The electronic system of claim 12, wherein a second semiconductor memory device among the plurality of semiconductor memory devices comprises:

a second memory core comprising a plurality of second memory cells that store second data among the plurality of data;

a second internal cache; and a second memory device processor disposed on a second data path between the processor and the second memory core, the second memory device processor being configured to access the second data via the second data path, analyze second statistical characteristics of the second data, identify at least one third statistical feature value associated with the second statistical characteristics corresponding to a first data group of the second data and at least one fourth statistical feature value associated with the first statistical characteristics corresponding to a second data group of the second data, concurrently store the at least one third statistical feature value and the at least one fourth statistical feature value, and transmit the at least one third statistical feature value or the at least one fourth statistical feature value to the processor.

14. The electronic system of claim 13, further comprising circuitry configured to merge the at least one first statistical feature value and the at least one second statistical feature value.

15. The electronic system of claim 14, wherein the circuitry is disposed inside the processor, the first semiconductor memory device or the second semiconductor memory device.

16. The electronic system of claim 14, wherein the circuitry is disposed outside the processor, the first semiconductor memory device and the second semiconductor memory device.

17. The electronic system of claim 12, further comprising a Network-on Chip (NoC) interposed between the processor and the plurality of semiconductor memory devices.

18. An electronic system comprising:

at least one processor; and a plurality of semiconductor memory devices, wherein each of the plurality of semiconductor memory devices comprises:

a memory core comprising a plurality of memory cells configured to store a plurality of data provided from the at least one processor;

an internal cache; and a memory device processor disposed on a data path between the at least one processor and the memory core, the memory device processor being configured to access the plurality of data via the data path while the at least one processor is storing the plurality of data in the memory core, access the plurality of data from the memory core during an idle time of the memory core after the plurality of data is stored in the memory core, analyze statistical characteristics of the plurality of data, identify at least one first statistical feature value associated with the statistical characteristics corresponding to a first data group of the plurality of data, identify at least one second statistical feature value associated with the statistical characteristics corresponding to a second data group of the plurality of data, concurrently store the at least one first statistical feature value and the at least one second statistical feature value in the internal cache, and transmit the at least one first statistical feature value or the at least one second statistical feature value to the at least one processor, and wherein the internal cache is configured to concurrently store the at least one first statistical feature value, first address information of the first data group, the at least one second statistical feature value and second address information of the second data group, and transmit the stored at least one first statistical feature value to the at least one processor instead of transmitting the plurality of data corresponding to the first data group to the at least one processor based on the at least one processor requesting the statistical characteristics of the plurality of data corresponding to the first data group.

* * * * *